United States Patent [19]

Hasegawa et al.

[11] Patent Number: 4,729,107
[45] Date of Patent: Mar. 1, 1988

[54] PATTERN DATA CONVERSION PROCESSING SYSTEM

[75] Inventors: Hirokazu Hasegawa; Hideki Kudoh; Takashi Aoki, all of Tokyo, Japan

[73] Assignee: Casio Computer Co., Ltd., Tokyo, Japan

[21] Appl. No.: 772,946

[22] Filed: Sep. 5, 1985

[30] Foreign Application Priority Data

Sep. 17, 1984 [JP] Japan ................................ 59-194391
Sep. 17, 1984 [JP] Japan ................................ 59-194393
Sep. 17, 1984 [JP] Japan ................................ 59-194397

[51] Int. Cl.⁴ ........................ G06F 3/14; G06F 15/40
[52] U.S. Cl. ................................. 364/519; 364/518; 340/727; 340/735; 340/799; 382/46; 382/47
[58] Field of Search ................. 364/518–521; 340/723, 727, 731, 735, 798, 799; 382/46, 47, 45

[56] References Cited

U.S. PATENT DOCUMENTS

| 3,760,357 | 9/1973 | Inose et al. | 382/46 |
| 3,976,982 | 8/1976 | Eiselen | 382/44 |
| 4,381,547 | 4/1983 | Ejiri | 382/47 |
| 4,517,578 | 5/1985 | Tazaki | 364/518 |
| 4,580,242 | 4/1986 | Suzuki et al. | 364/518 |
| 4,590,585 | 5/1986 | Cummings et al. | 364/518 |
| 4,615,012 | 9/1986 | Arazu et al. | 364/520 |
| 4,635,212 | 1/1987 | Hatazawa | 364/518 |

FOREIGN PATENT DOCUMENTS

| EP0093429 | 11/1983 | European Pat. Off. | |
| 53-077428 | 7/1978 | Japan | 364/518 |
| 54-109330 | 8/1979 | Japan | 364/518 |
| 57-169866 | 10/1982 | Japan | 364/518 |
| 59-123037 | 7/1984 | Japan | 364/518 |
| 2025671 | 1/1980 | United Kingdom | |
| 1558458 | 1/1980 | United Kingdom | |
| 2082815 | 3/1982 | United Kingdom | |

OTHER PUBLICATIONS

"NTG-Fachberichte", vol. 67, VDE-Verlag GmbH, Berlin, pp. 183 to 193.

Primary Examiner—Errol A. Krass
Assistant Examiner—Brian M. Mattson
Attorney, Agent, or Firm—Frishauf, Holtz, Goodman & Woodward

[57] ABSTRACT

In a pattern data conversion processing system, one-character pattern data generated by a character generator is divided by a shift register into a plurality of basic pattern data. The divided basic pattern data are sequentially subjected to enlargement, 90° conversion or non-rotational conversion by using a 4/3 times elongation conversion ROM, a double elongation/90° conversion ROM and a bypass circuit. The converted one-character data is stored in a one-character ROM and, as such, the one-character pattern data from the one-character ROM is stored by a direct memory access controller (DMAC) into a frame memory. When 180° conversion is designated, the one-character data is subjected to 90° conversion, and the converted data is stored in the frame memory. The pattern data from the frame memory is transferred by the DMAC to a page printer which then prints the transferred data.

6 Claims, 188 Drawing Figures

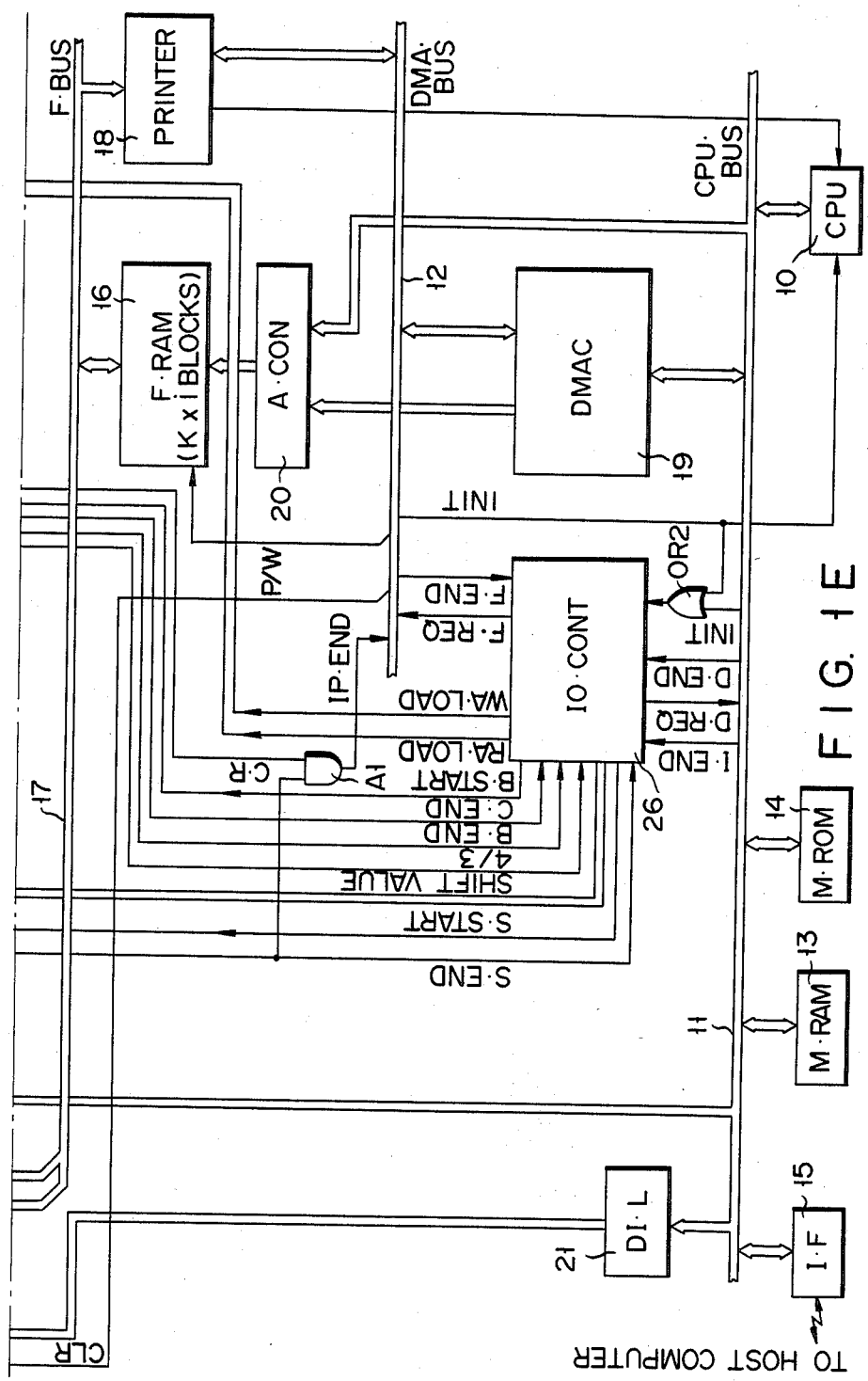
F I G. 1E

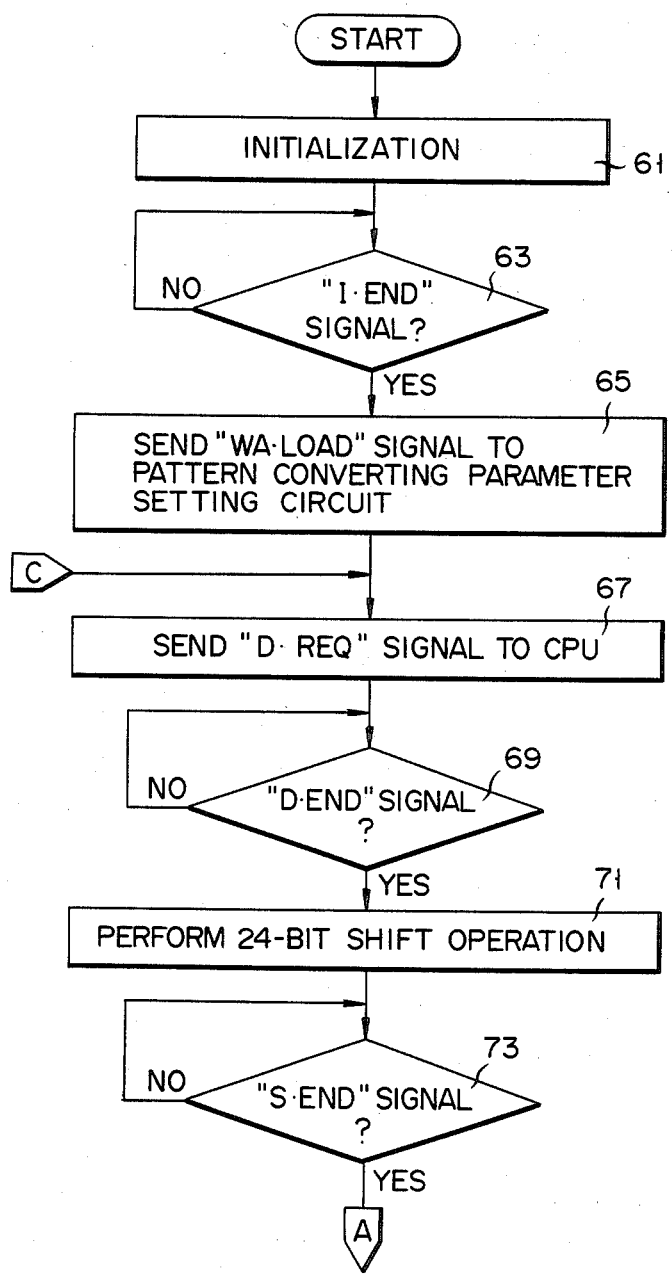

| YH | XWA | YWA | XRA | YRA | MODE | | | | | |
|---|---|---|---|---|---|---|---|---|---|---|
| | | | | | 4/3 | 90° | 2y | E/O | 180° | BA |
| F4 | F4 | F4 | E8 | F4-S6 | O | O | O | 1 | 1 | 1 |
| F4 | F4 | F4 | D0 | F4-S6 | O | O | O | 1 | 1 | 1 |
| E8 | F4 | E8 | E8 | E8-S6 | O | O | 1 | 1 | 1 | 1 |
| E8 | F4 | E8 | D0 | E8-S6 | O | O | 1 | 1 | 1 | 1 |
| --- | --- | --- | --- | --- | --- | --- | --- | --- | --- | --- |
| E0 | F8 | E0 | C0 | E0-S6 | 1 | O | 1 | 1 | 1 | 1 |
| F4 | 17 | F4 | 00 | F4-S6 | O | 1 | O | 1 | 1 | 1 |
| E8 | 17 | F4 | 00 | E8-S6 | O | 1 | 1 | 1 | 1 | 1 |
| F4 | 2F | F4 | 00 | F4-S6 | O | 1 | O | 1 | 1 | 1 |
| E8 | 2F | F4 | 00 | E8-S6 | O | 1 | 1 | 1 | 1 | 1 |
| --- | --- | --- | --- | --- | --- | --- | --- | --- | --- | --- |
| E0 | 3F | F8 | 00 | E0-S6 | 1 | 1 | 1 | 1 | 1 | 1 |

X MDR

| 90° | SS1 | SS0 | X5 | X4 | X3 | X2 | X1 | X0 |
|---|---|---|---|---|---|---|---|---|
| 0 | 0 | 0 | XA2 | XA1 | XA0 | SA2 | SA1 | SA0 |
| 0 | 0 | 1 | XA3 | XA2 | XA1 | XA0 | SA1 | SA0 |
| 0 | 1 | 0 | XA4 | XA3 | XA2 | XA1 | XA0 | SA0 |
| 0 | 1 | 1 | XA5 | XA4 | XA3 | XA2 | XA1 | XA0 |
| 1 | – | – | XA5 | XA4 | XA3 | XA2 | XA1 | XA0 |

FIG. 7

Y MDR

| 90° | SS1 | SS0 | Y4 | Y3 | Y2 | Y1 | Y0 |
|---|---|---|---|---|---|---|---|
| 0 | – | – | YA4 | YA3 | YA2 | YA1 | YA0 |
| 1 | 0 | 0 | YA1 | YA0 | SA2 | SA1 | SA0 |
| 1 | 0 | 1 | YA2 | YA1 | YA0 | SA1 | SA0 |
| 1 | 1 | 0 | YA3 | YA2 | YA1 | YA0 | SA0 |
| 1 | 1 | 1 | YA4 | YA3 | YA2 | YA1 | YA0 |

3 X 3 BIT
2 X 2 BIT

| DOUBLE ELONGATION ROM INPUT PATTERN | DOUBLE ELONGATION ROM STORAGE PATTERN | | | |
|---|---|---|---|---|
| | 2y = 0<br>90°= 0 | 2y = 1<br>90°= 0 | 2y = 0<br>90°= 1 | 2y = 1<br>90°= 1 |
| P1 P2<br>P1 P3 | | | | |

FIG. 9

| 4/3 CONVERSION ROM INPUT PATTERN | 4/3 CONVERSION ROM STORAGE PATTERN | 4/3 CONVERSION ROM OUTPUT PATTERN | | | |
|---|---|---|---|---|---|
| | | IB.A = 0 IB.B = 0 | IB.A = 1 IB.B = 0 | IB.A = 0 IB.B = 1 | IB.A = 1 IB.B = 1 |

| | 1 CYCLE INPUT PATTERN | 1 CYCLE OUTPUT PATTERN | | 1 CYCLE WRITE SEQUENCE | |
|---|---|---|---|---|---|
| | | 90°=0 | 90°=1 | 90°=0 | 90°=1 |
| DOUBLE IN X,Y DIRECTIONS | 0 2<br>1 3 | 0 0 2 2<br>0 0 2 2<br>1 1 3 3<br>1 1 3 3 | 1 1 0 0<br>1 1 0 0<br>3 3 2 2<br>3 3 2 2 | 0 1 2 3<br>4 5 6 7 | 6 4 2 0<br>7 5 3 1 |
| ~ | ~ | ~ | ~ | ~ | ~ |
| 4/3 CONVERSION DOUBLE IN X,Y DIRECTIONS | 0 4 8 C<br>1 5 9 D<br>2 6 A E<br>3 7 B F | 0 0 4 4 8 8 C C<br>0 0 4 4 8 8 C C<br>1 1 5 5 9 9 D D<br>1 1 5 5 9 9 D D<br>2 2 6 6 A A E E<br>2 2 6 6 A A E E<br>3 3 7 7 B B F F<br>3 3 7 7 B B F F | 3 3 2 2 1 1 0 0<br>3 3 2 2 1 1 0 0<br>7 7 6 6 5 5 4 4<br>7 7 6 6 5 5 4 4<br>B B A A 9 9 8 8<br>B B A A 9 9 8 8<br>F F E E D D C C<br>F F E E D D C C | 0 1 2 3 4 5 6 7<br>8 9 10 11 12 13 14 15<br>16 17 18 19 20 21 22 23<br>24 25 26 27 28 29 30 31 | 28 24 20 16 12 8 4 0<br>29 25 21 17 13 9 5 1<br>30 26 22 18 14 10 6 2<br>31 27 23 19 15 11 7 3 |

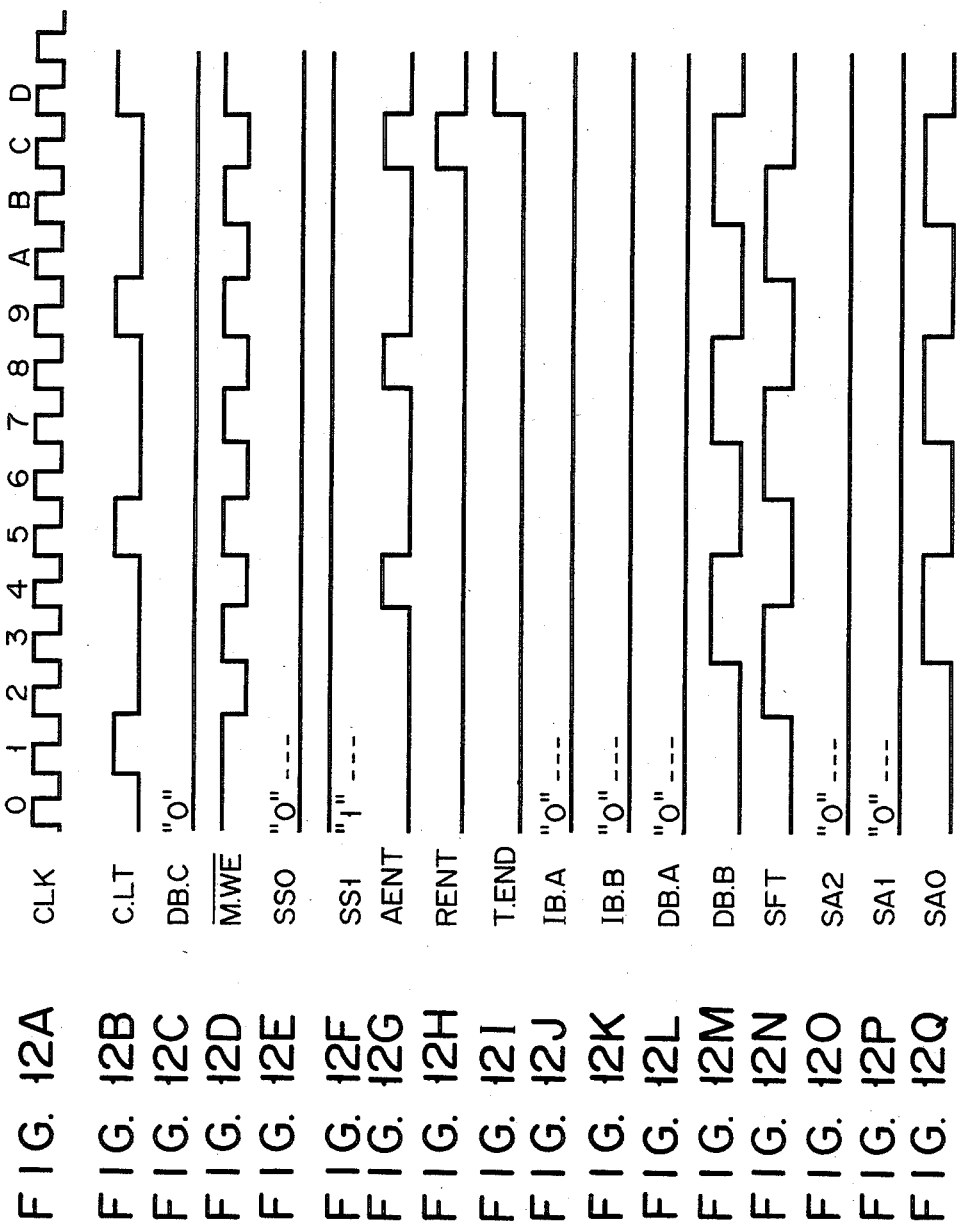

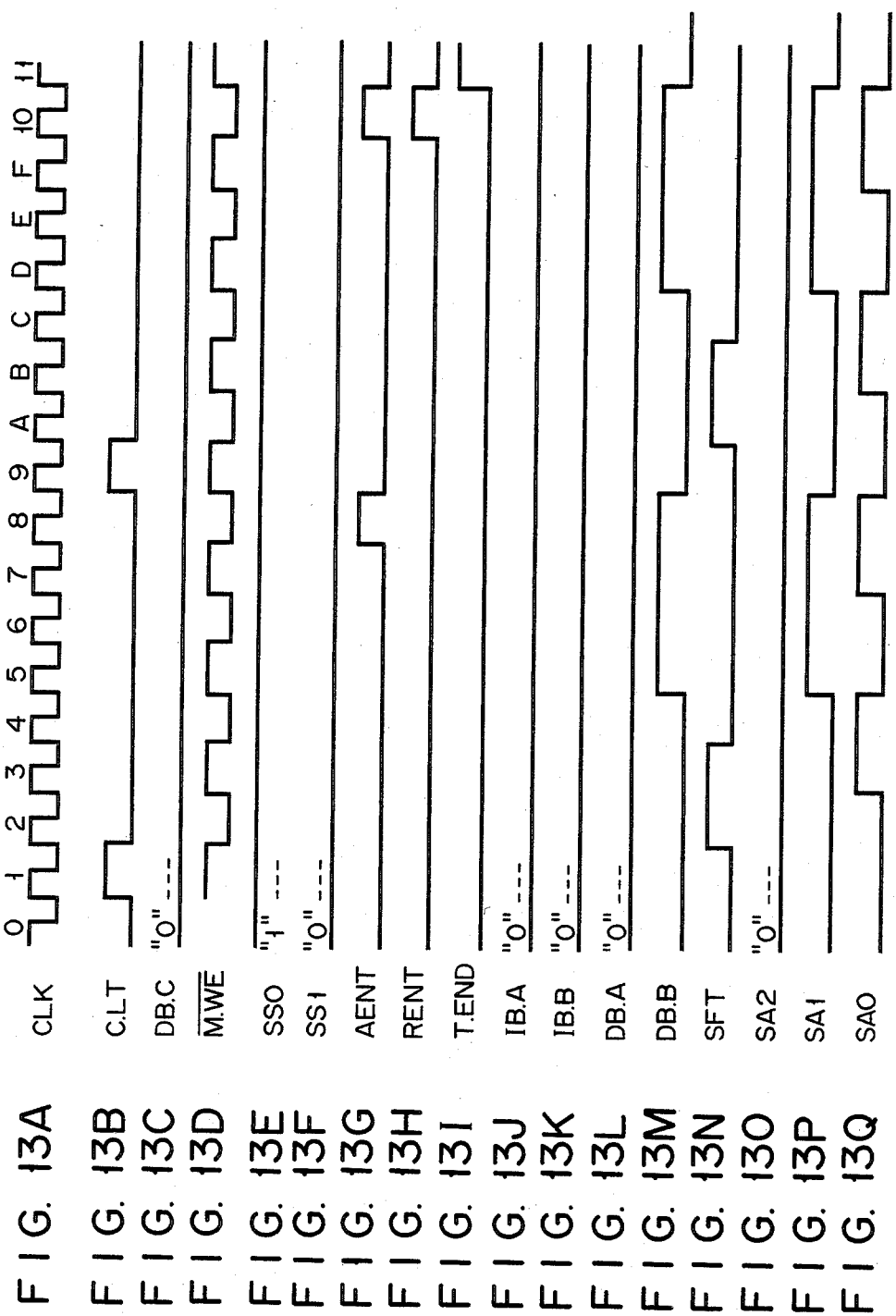

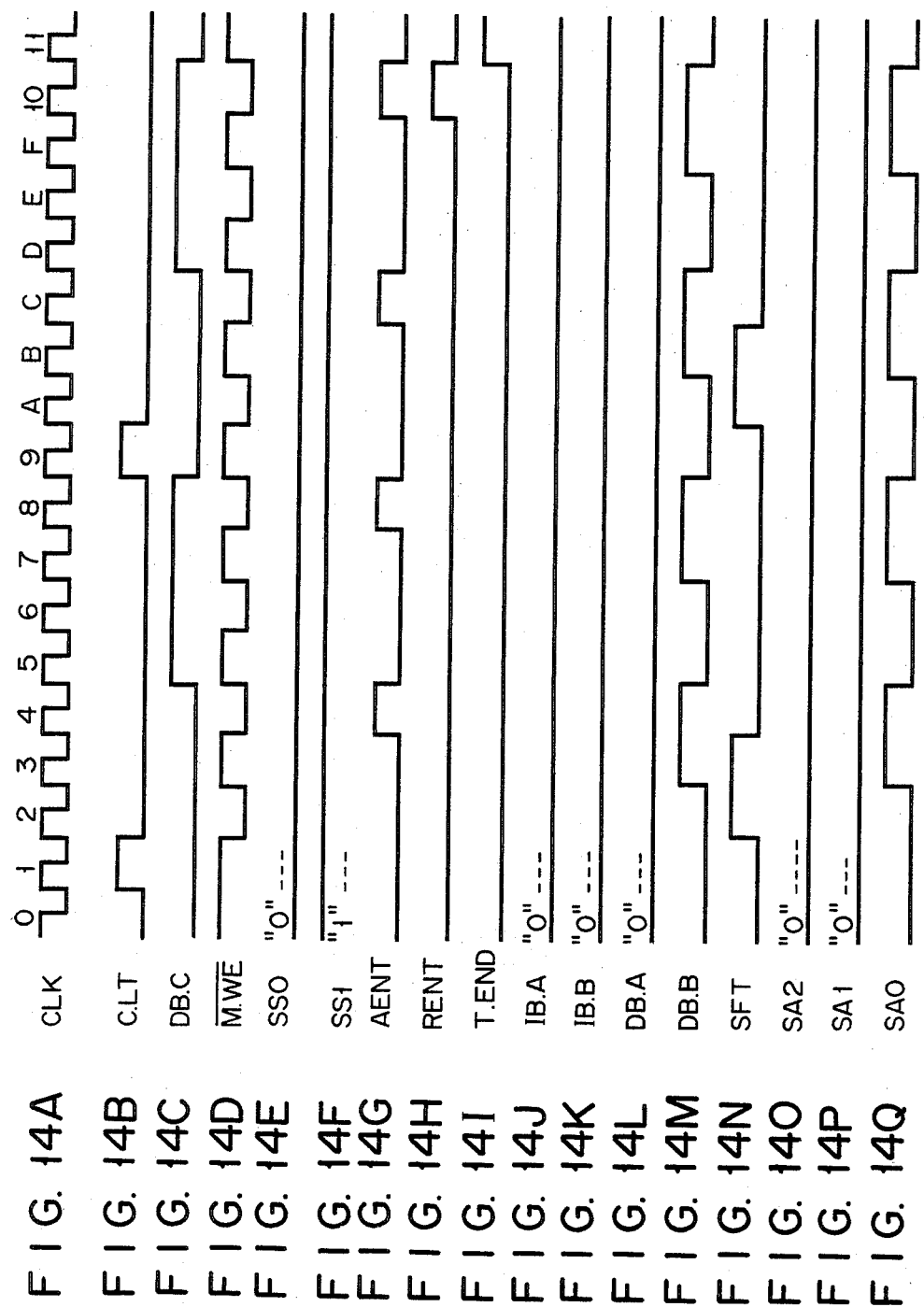

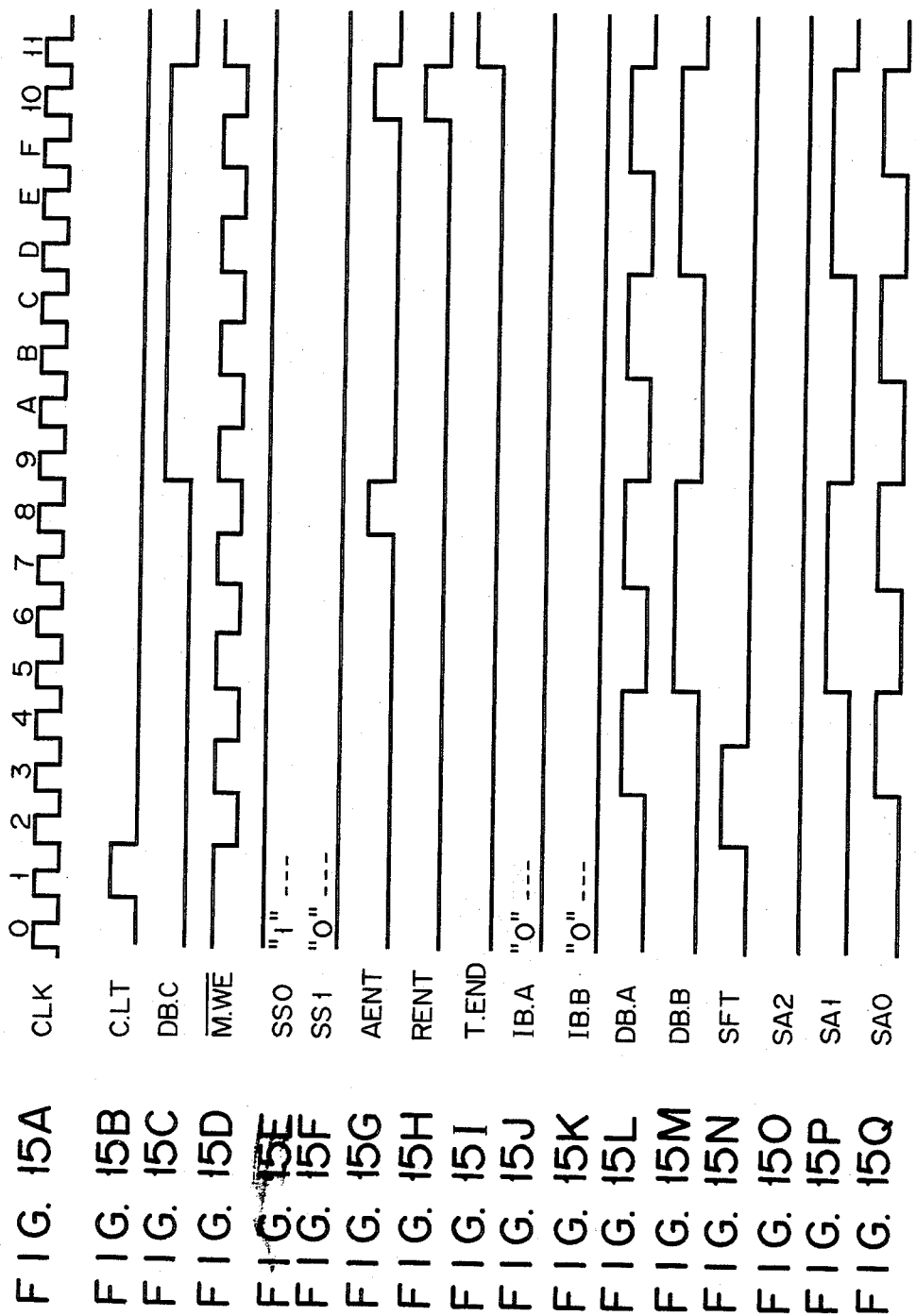

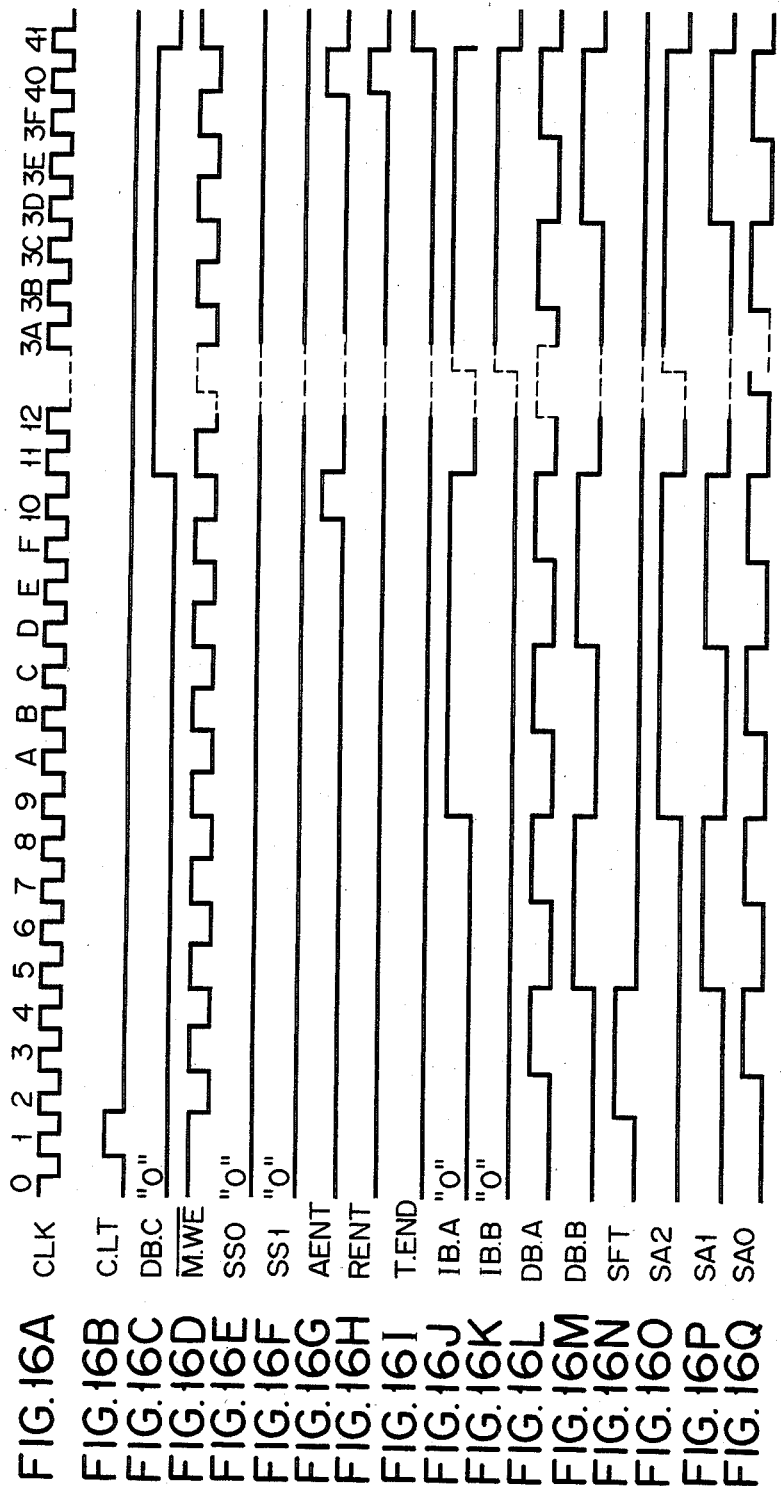

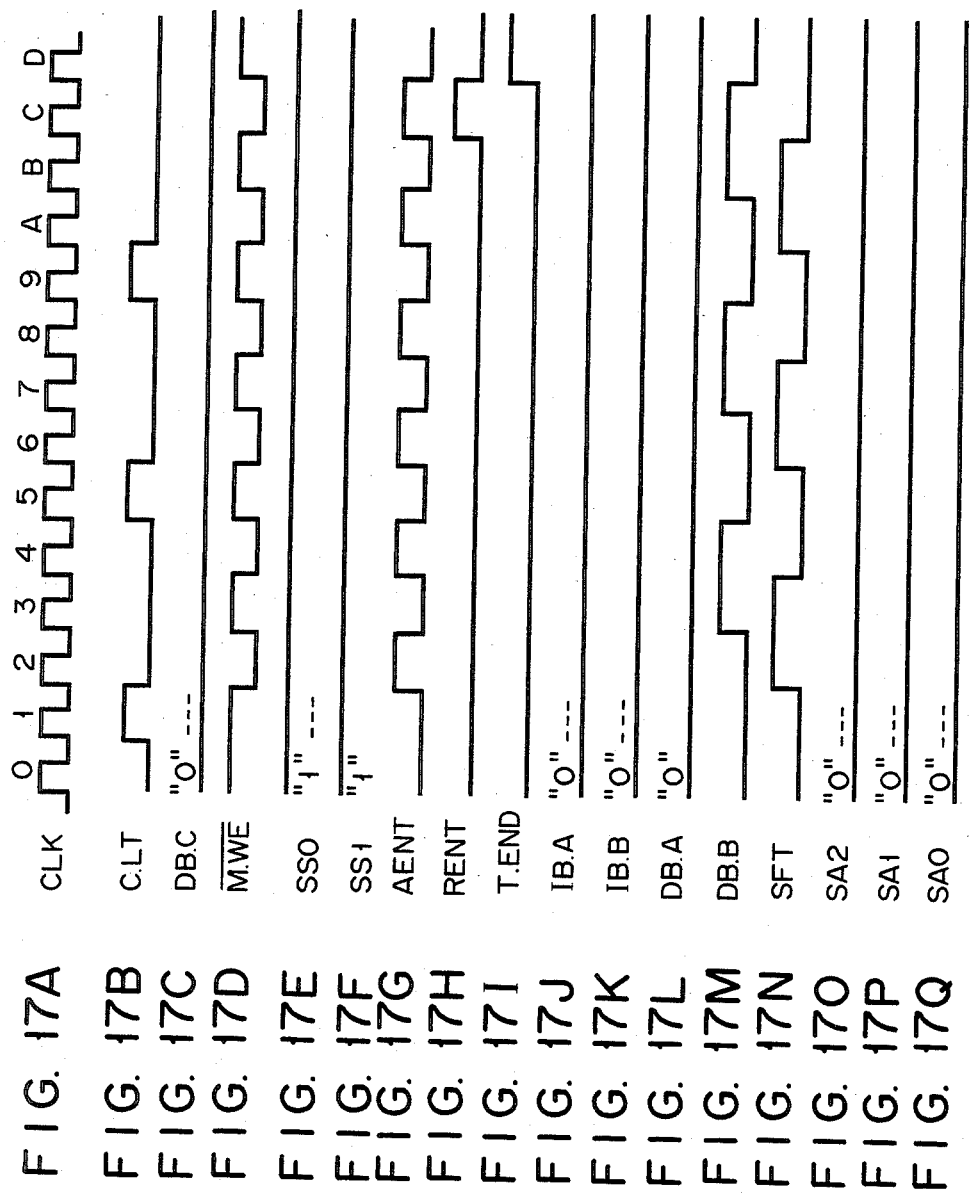

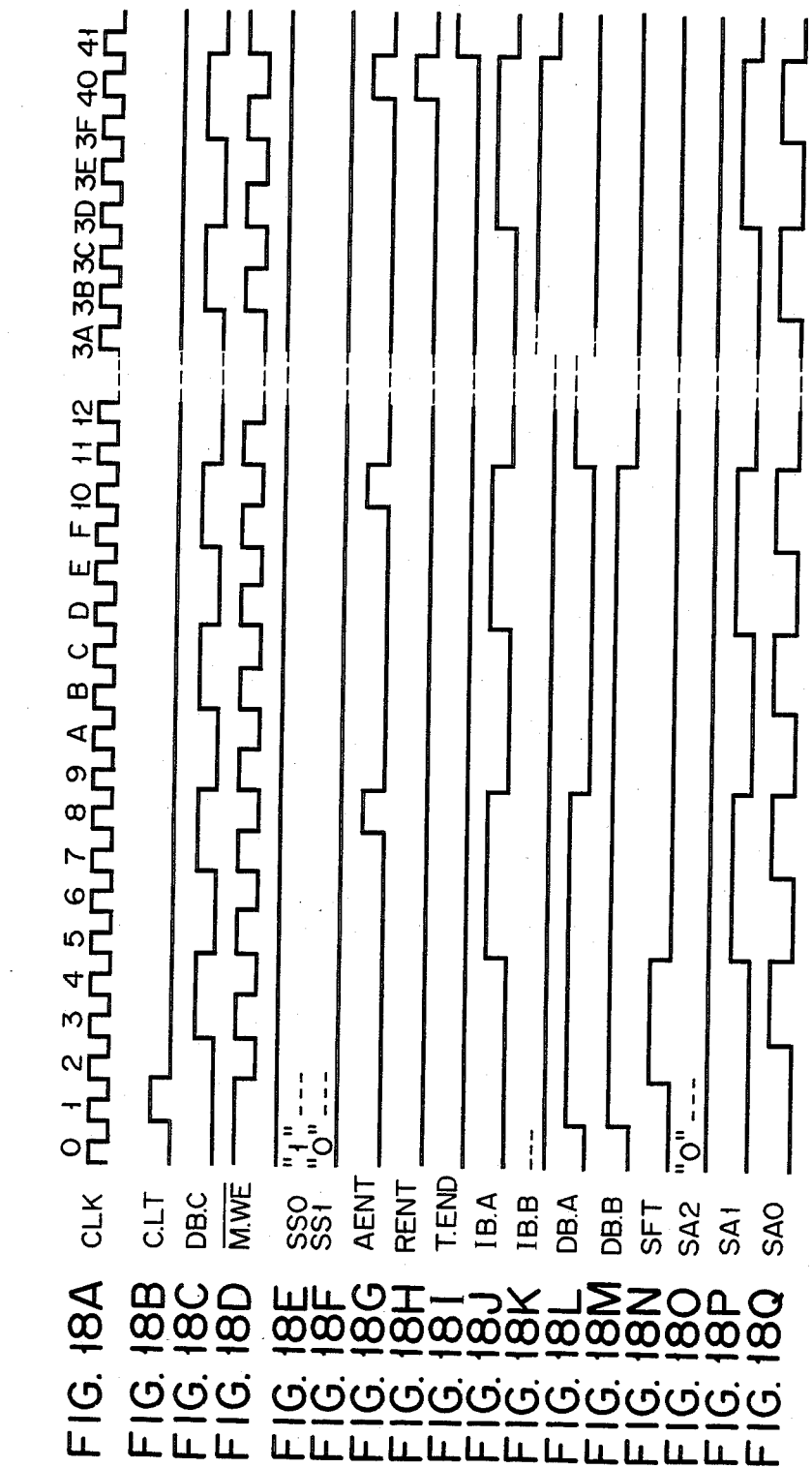

F I G. 19
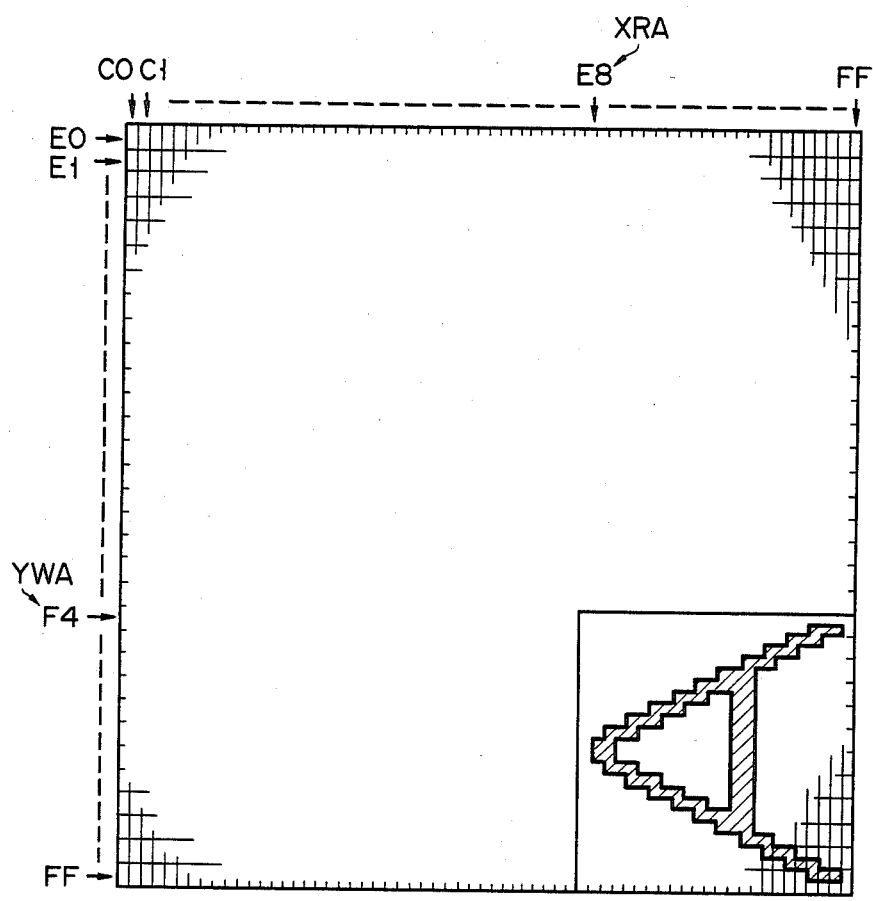

F I G. 21
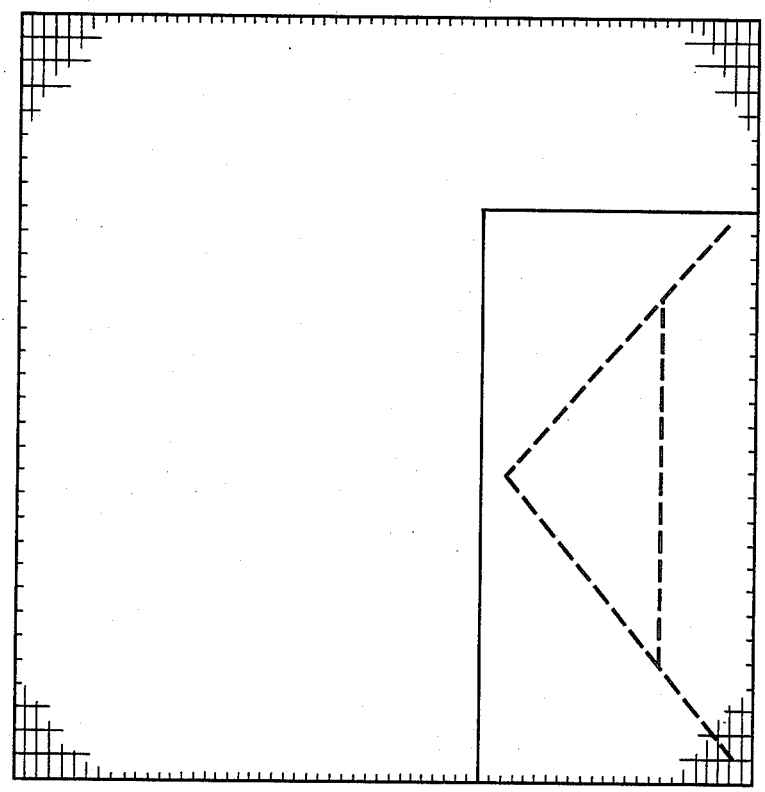

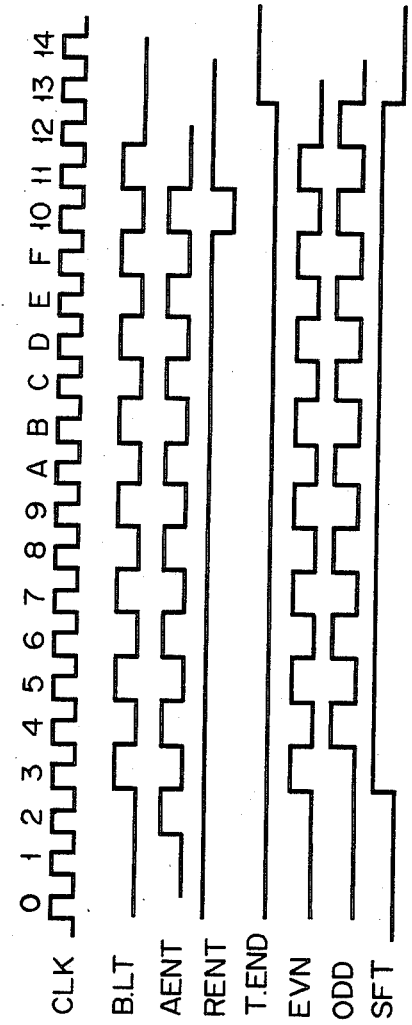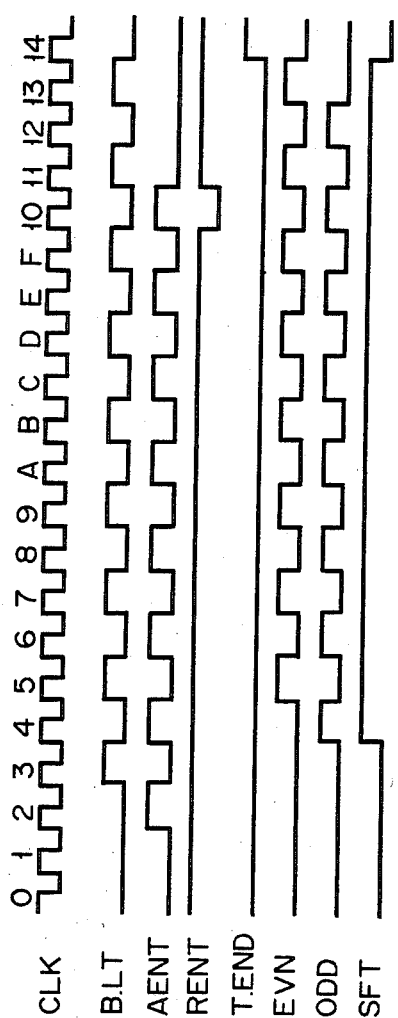

FIG. 33

| FORMAT | INITIAL VALUE | | |
|---|---|---|---|
| | 90° | 180° | DMAC |
| 1 | 0 | 0 | X↑ DEC<br>y↑ INC |
| 2 | 1 | 1 | X↑ INC<br>y↑ DEC |
| 3 | 1 | 1 | X↑ INC<br>y↑ DEC |
| 4 | 0 | 1 | X↑ INC<br>y↑ DEC |
| 5 | 1 | 0 | X↑ DEC<br>y↑ INC |
| 6 | 0 | 0 | X↑ DEC<br>y↑ INC |
| 7 | 0 | 0 | X↑ DEC<br>y↑ INC |
| 8 | 1 | 1 | X↑ INC<br>y↑ DEC |

TBL

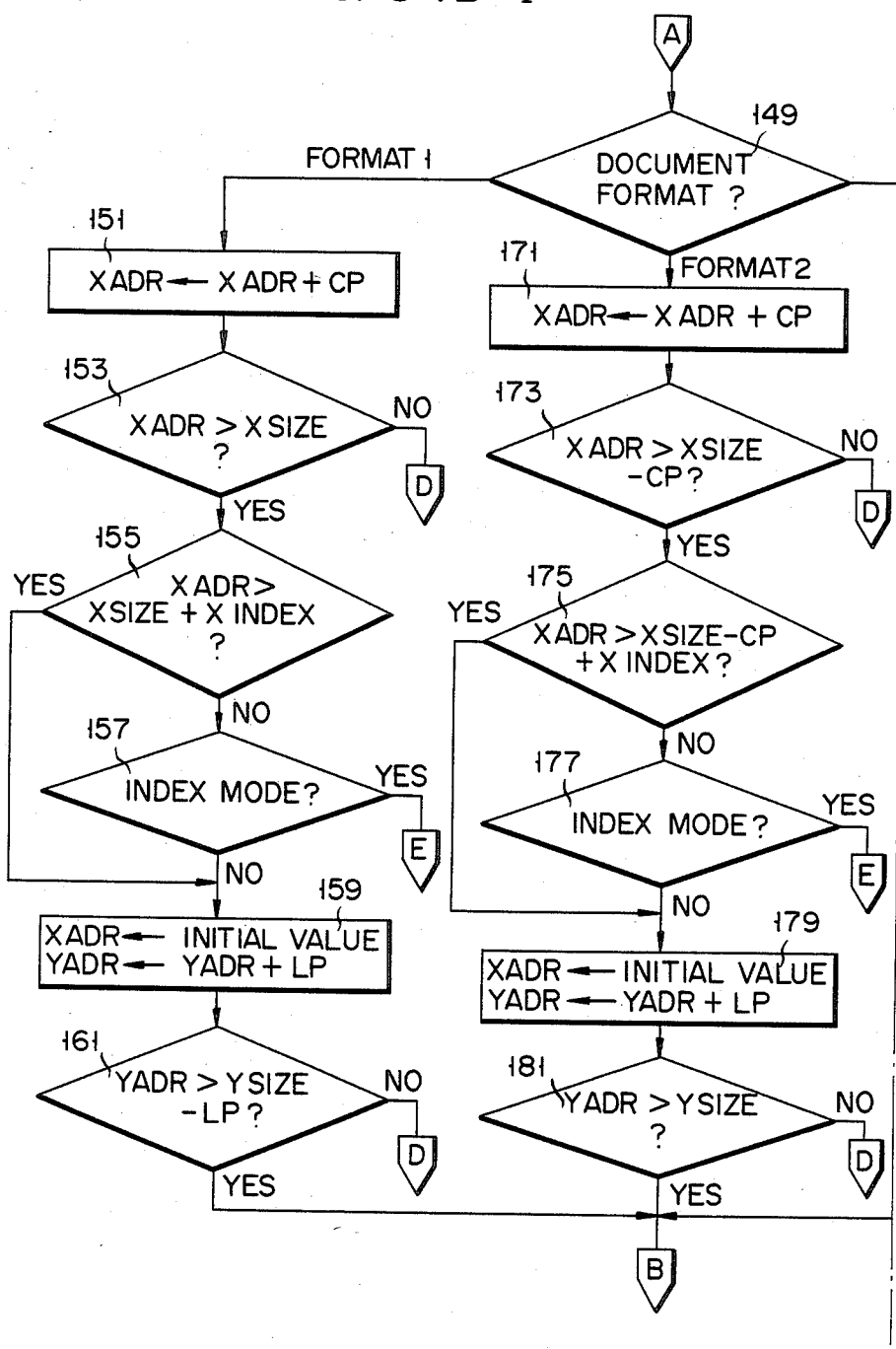
FIG. 34B-I

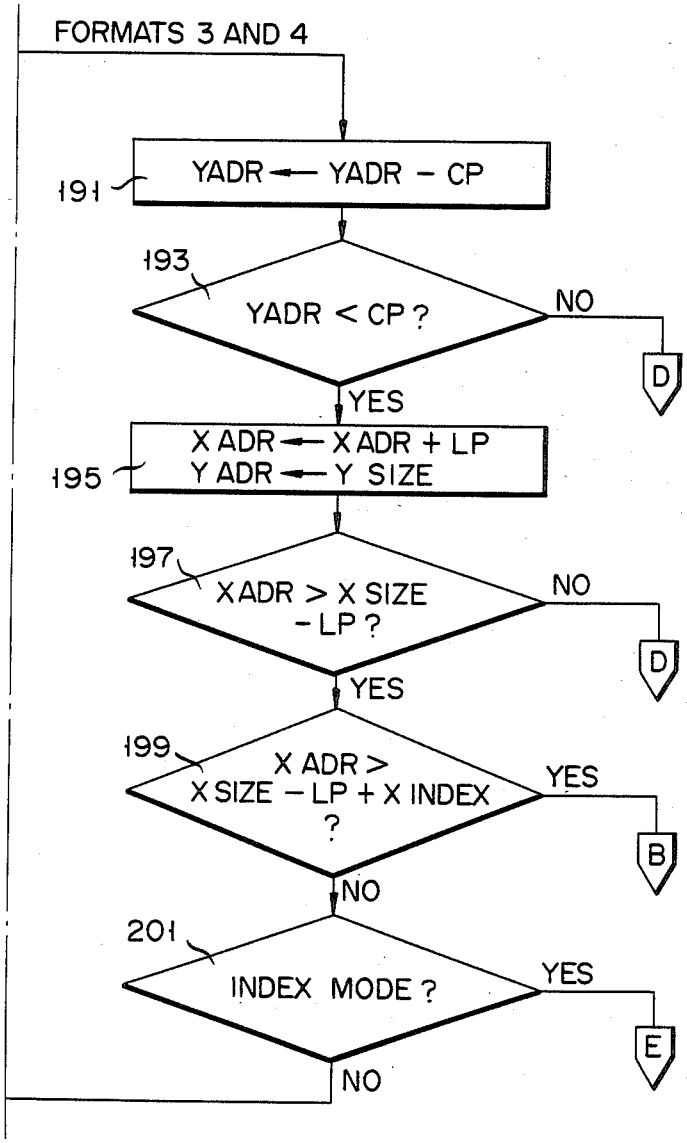
FIG. 34B-II

SEPARATION WIDTH

F I G. 39
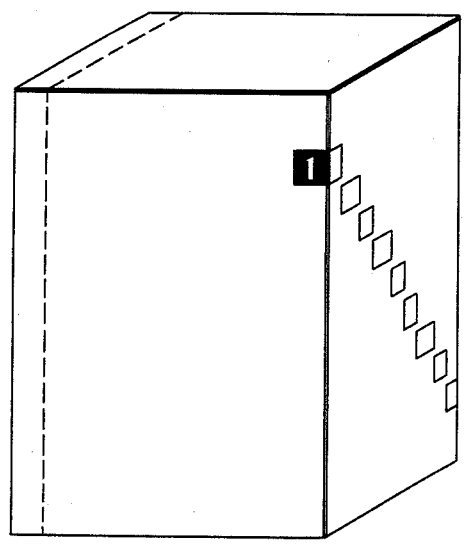

FIG. 40A
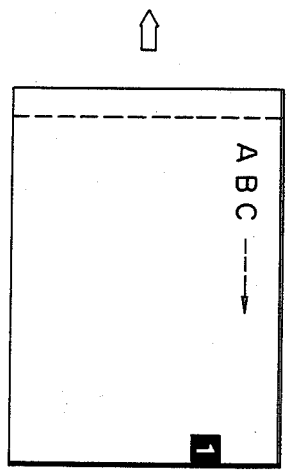
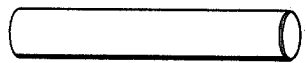
FIG. 40B
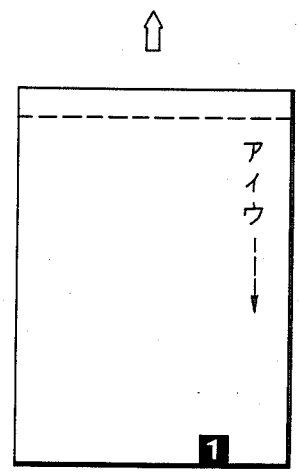
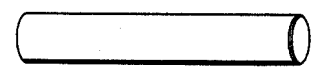
FIG. 40C
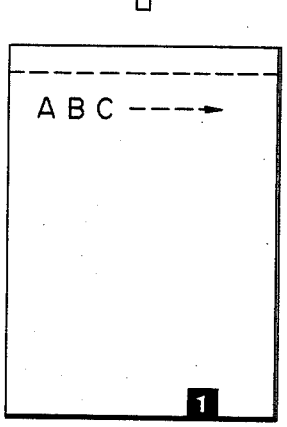
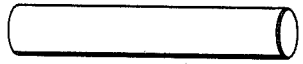
FIG. 40D
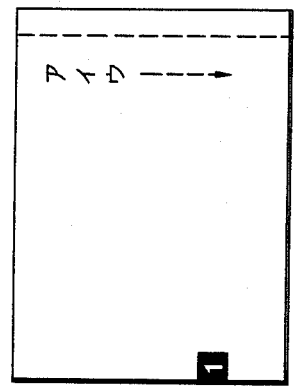
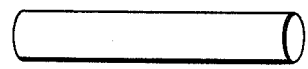

PATTERN DATA CONVERSION PROCESSING SYSTEM

BACKGROUND OF THE INVENTION

The present invention relates to a pattern data conversion processing system, used in a pattern conversion mechanism such as a page printer control mechanism, for converting character pattern data of a predetermined matrix to dot data.

In a conventional printer control mechanism for printing a character in a dot matrix form, when the dot matrices of all the characters to be printed have an identical number of dots, an address corresponding to this number of dots is generated so as to easily write the respective character patterns in a memory. However, when different types of dot matrix formats are used, write access of the memory is very complicated. In particular, in order to perform, with a single circuit, processing (e.g., longitudinal or transverse double elongation or enlargement of a character) of characters with different dot matrix formats, different dot pattern data are generated, making the circuit arrangement and control procedures very complex. Therefore, a common processing circuit cannot be used, resulting in inconvenience.

In a conventional printer for printing characters in a dot matrix, each character has a 24×24 dot matrix printing format on slips, vouchers or the like, and a 32×32 dot matrix when printed on normal documents. In order to arbitrarily print characters having two different dot matrix formats with a single printer, two types of character generators for storing a large number of kanji characters, numerals, letters, hiragana characters and katakana characters are required for each dot matrix format. As a result, the character generator section is very costly.

After double elongation conversion (i.e., double elongation of the height or width of a character) of a character pattern generated from the corresponding character generator is performed in a conventional dot matrix printer, the converted character pattern is printed out. However, in order to perform double elongation conversion of the character patterns generated from the two character generators for storing patterns of different dot matrix formats, two independent conversion circuits are required, complicating the circuit arrangement and control procedures and greatly increasing the cost.

When pattern data having a predetermined dot matrix format is read out from a memory and written into the same memory or another memory, bit shifting of a write position by an arbitrary number of bits is often required. Conventionally, one-word pattern data is read out from the memory and written into a shift register. The one-word pattern data is shifted by an arbitrary number of bits in the shift register, and the shifted data is then written into the memory.

According to the conventional configuration described above, however, input and shift control operations of the shift register are complex.

A conventional page printer has an image memory for storing one-page pattern data. When pattern data is written in a predetermined area of the image memory, the pattern data accessed, in units of words, from the image memory is superposed on the pattern data shifted in accordance with the write position of the image memory, and the resultant data is written into the image memory. The conventional system requires a latch for latching the pattern data read out from the image memory, a latch for latching the pattern data to be written in the image memory, and a latch for latching the superposed data. As a result, the circuit arrangement is complicated.

In a conventional printer for printing each character in a dot matrix, characters are rotated in accordance with either a vertical or a horizontal printout direction. A character pattern generated from a character generator is rotated, and the rotated pattern is printed. Character rotation is performed with hardware. When character patterns are rotated at the different rotation angles of 90 degrees counterclockwise, and 90 and 180 degrees clockwise, many conversion pattern generators for generating converted patterns having predetermined rotational angles, and many control circuits for writing the respective converted patterns in the printing buffers are required, resulting in an intricate control operation.

A conventional page printer is used for printing a large number of sheets, as in the compilation of a printed document. However, in the conventional page printer, no consideration is made for binding margins (i.e., gutters) for compiling. For this reason, some of the characters are concealed within a binding margin. Character rotation and page memory write access must be sequentially performed in accordance with which side of a sheet is to be used as a binding margin and which one of either a vertical or a horizontal printout direction is selected. However, these considerations have never been dealt with in conventional page printers.

It takes time to retrieve a desired page while the printed sheets are stacked. When the printed sheets are compiled and bound, a desired page cannot be found when the book is closed.

SUMMARY OF THE INVENTION

It is an object of the present invention to provide a pattern data conversion processing system for selectively converting a character pattern generated from a single character generator to a dot pattern.

In order to achieve the above object of the present invention, there is provided a pattern data conversion processing system comprising:

means for storing a large number of character pattern data, and for generating character pattern data corresponding to an input character code;

means for extracting one-character pattern data, generated by the pattern data generating means, to produce a plurality of basic pattern data, and for sequentially generating the respective basic pattern data;

means for generating enlarged pattern data in response to the basic pattern data;

means for sequentially receiving the enlarged pattern data, and for storing one-character pattern data;

means for reading out the one-character pattern data every time the one-character pattern data is stored in the one-character data storing means;

means for receiving the one-character pattern data read out by the readout means, and for storing one-page character pattern data; and means for printing the one-page character pattern data read out from the one-page character pattern data storing means.

According to the pattern data conversion processing system, the character pattern generated from the single character generator can be converted to a character pattern having another dot matrix. A double elongation converter can commonly be used to simplify the circuit arrangement. As a result, an inexpensive pattern conversion mechanism can be implemented.

In a memory access control mechanism for accessing pattern data with different block dot formats, a block address generator and an intrablock minimum unit write address generator are independently arranged to achieve write control by changing the number of bits of the unit address even if the dot format of one block is changed. As a result, in the memory access control mechanism for accessing pattern data having different block dot formats, the address control mechanism can be simplified, thereby creating an inexpensive system.

According to the present invention, a dot pattern shifted by an arbitrary number of dots can be generated, indicating that a pattern shift function for an arbitrary number of shift dots can be achieved with a simple construction.

Furthermore, according to the present invention, a memory means required for writing the pattern data in a frame memory, and a memory means required for converting the pattern data are used in common by a single shift register, thereby simplifying the pattern conversion mechanism as a whole.

Furthermore, according to the present invention, when a character subjected to rotation is written into a data storage means (i.e., a one-character buffer), 90°/0° conversion is performed. When the character is written into a image storage means (i.e., a frame memory), 180°/0° conversion is performed. In order to generate at 90° converted pattern, the pattern data storage means further stores either a 90° conversion pattern or a non-conversion pattern. Therefore, the write control can be simplified.

Furthermore, according to the present invention, the pattern data conversion processing system has a pattern conversion means for rotating the pattern data to be developed in the frame memory in a direction designated to preset format designation data, and a means for developing pattern-converted data in the frame memory along a direction perpendicular or parallel to the longitudinal direction of a binding margin designated by the format designation data. The character arrangement can be predetermined with respect to the binding margin so as to optimize the character arrangement position on a printing sheet. As a result, unlike the conventional system, the potential for a character arrangement error upon compilation of the printed sheets can be eliminated.

According to the present invention, the pattern data conversion processing system has a memory means for storing index data so as to generate the data at an index data write position of the page memory, and a means for discriminating a write designation position of the index data during write access of the page memory. The index data can be selectively written in the index designation area. Thus, even if the printed sheets are compiled, the desired pages can be easily identified, thereby improving work efficiency.

BRIEF DESCRIPTION OF THE DRAWINGS

Other objects and features of the present invention will be apparent from the following description taken in connection with the accompanying drawings, in which:

FIGS. 1A through 1E are block diagrams showing a pattern data conversion processing system according to an embodiment of the present invention;

FIGS. 4A through 4C are flow charts for explaining the operation of an input/output controller (IO·CONT) shown in FIG. 1E;

FIG. 5 is a table showing the relationship between pattern conversion modes determined by different conversion designation data latched by a mode latch (MODE·L) shown in FIG. 1C, and the start address set in each address latch;

FIG. 6 is a table showing the relationship between the select signal (SSO-1), the 90° conversion designation data and the address bit string in an X address generator (XMDR) 47 shown in FIG. 1D;

FIG. 7 is a table showing the relationship between the select signal (SSO-1), the 90° conversion designation data and the address bit string in a Y address generator (YMDR) 46 shown in FIG. 1D;

FIG. 9 is a table showing input/output basic patterns with respect to a 4/3 times elongation conversion ROM 32 shown in FIG. 1A;

FIGS. 11A and 11B are tables showing one-cycle input/output patterns of the respective conversion modes in the double elongation/90° conversion ROM 34 shown in FIG. 1A;

FIGS. 12A through 12Q, FIGS. 13A through 13Q, FIGS. 14A through 14Q, FIGS. 15A through 15Q, FIGS. 16A through 16Q, FIGS. 17A through 17Q and FIGS. 18A through 18Q are timing charts of various signals generated from a timing controller 42 of FIG. 1D so as to form character dot patterns shown in FIGS. 19 through 25, in which FIGS. 12A, 13A, 14A, 15A, 16A, 17A and 18A show basic clock signals CLK; FIGS. 12B, 13B, 14B, 15B, 16B, 17B and 18B show latch timing signals (C·LT); FIGS. 12C, 13C, 14C, 15C, 16C, 17C and 18C show pattern division address signals (DB·C); FIGS. 12D, 13D, 14D, 15D, 16D, 17D and 18D show memory write enable signals ($\overline{M·WE}$); FIGS. 12E and 12F, 13E and 13F, 14E and 14F, 15E and 15F, 16E and 16F, 17E and 17F and 18E and 18F show scan address select signals (SS0 and SS1); FIGS. 12G, 13G, 14G, 15G, 16G, 17G and 18G show conversion end timing signals (AENT); FIGS. 12H, 13H, 14H, 15H, 16H, 17H and 18H show conversion end timing signals (RENT); FIGS. 12I, 13I, 14I, 15I, 16I, 17I and 18I show one-cycle write end signals (T·END); FIGS. 12J and 12K, 13J and 13K, 14J and 14K, 15J and 15K, 16J and 16K, 17J and 17K, and 18J and 18K show pattern division addresses (IB·A and IB·B); FIGS. 12L and 12M, 13L and 13M, 14L and 14M, 15L and 15M, 16L and 16M, 17L and 17M, and 18L and 18M show pattern division addresses (DB·A and DB·B); FIGS. 12N, 13N, 14N, 15N, 16N, 17N and 18N show shift control signals (SFT); and FIGS. 12O to 12Q, 13O to 13Q, 14O to 14Q, 15O to 15Q, 16O to 16Q, 17O to 17Q, and 18O to 18Q show scan addresses (SA2, SA1 and SA0);

FIG. 19 is an illustrative representation showing a dot development pattern when no rotational conversion is performed;

FIG. 21 is an illustrative representation showing a dot development pattern when no rotational conversion is performed and transverse (y direction) double elongation conversion is performed;

FIGS. 26A through 26H, and FIGS. 27A through 27H are timing charts showing the dot output control timings in accordance with the start bit designation data upon one-character buffer read access, in which FIGS. 26A through 26H show the case where an even/odd bit designation signal (EVN/ODD) designates even bits, and FIGS. 27A through 27H show the case where the EVN/ODD signal designates odd bits;

FIG. 33 is a format initial value table showing the initial values of the respective formats in the system of FIGS. 1A to 1E;

FIGS. 34A through 34D are flow charts explaining the CPU format and the index printing in the system of FIGS. 1A to 1E;

FIG. 39 is a representation showing a binding margin when the printed sheets are compiled; and FIGS. 40A through 40D are representations showing printing states in accordance with formats (5) through (8) of FIG. 33.

DETAILED DESCRIPTION OF THE PREFERRED EMBODIMENT

Figure 1A:
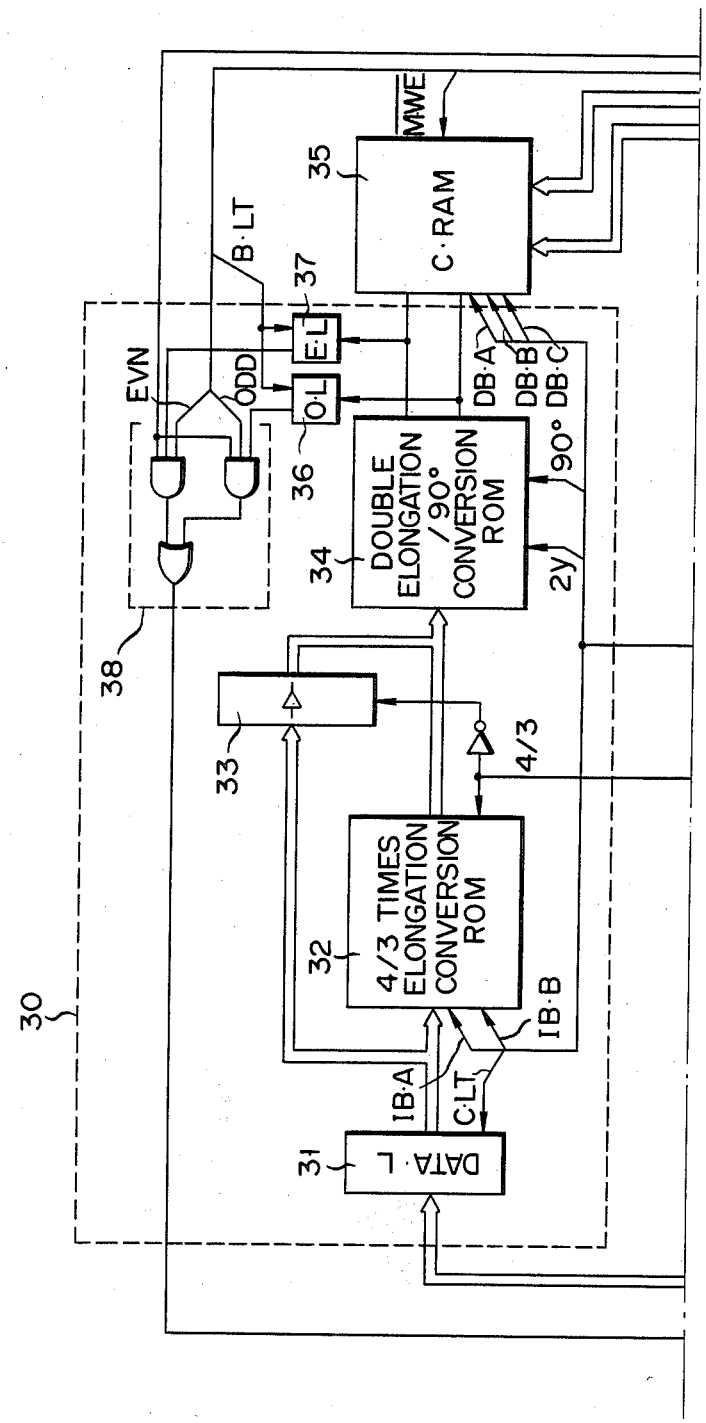
Figure 1B:
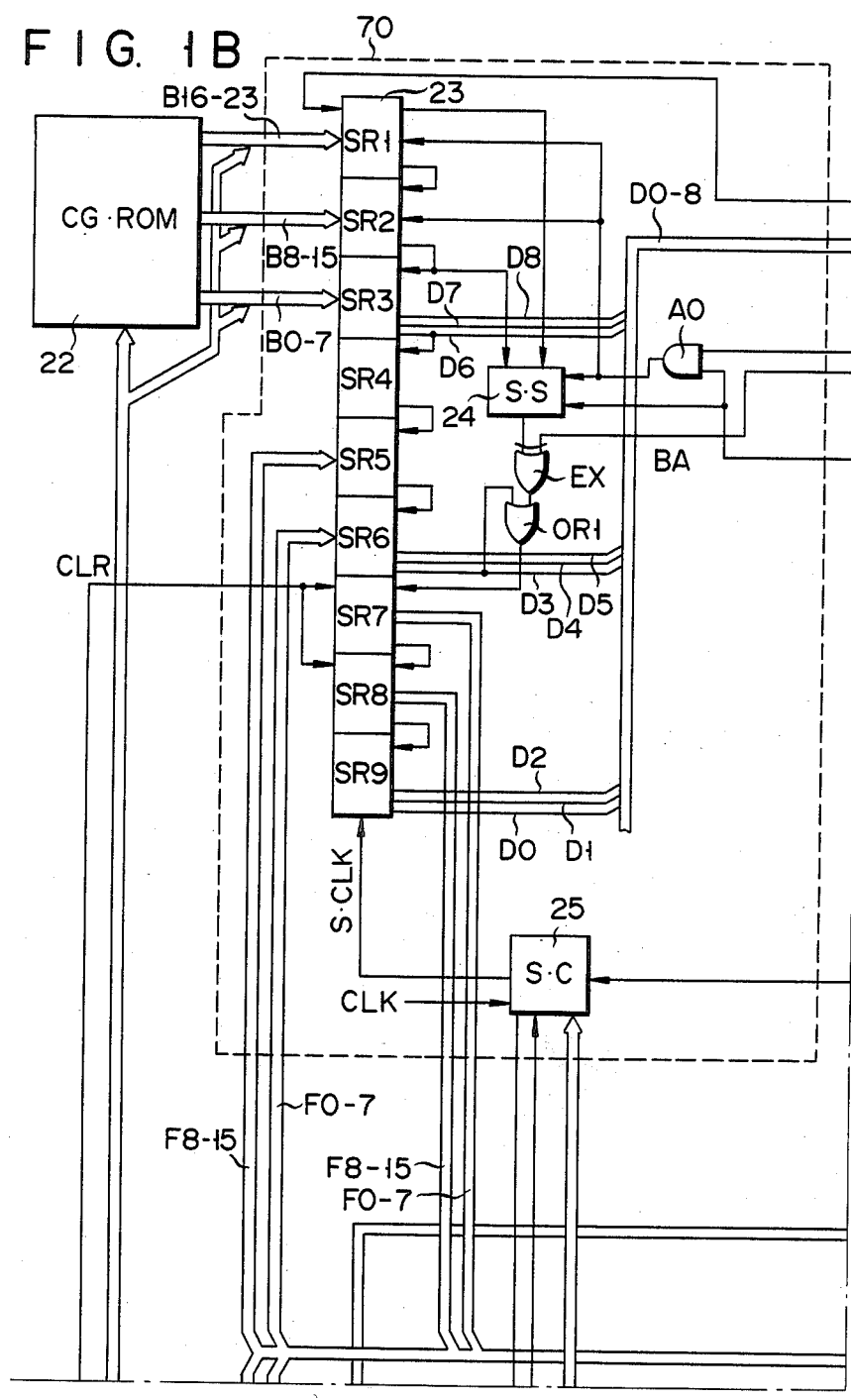
Figure 1C:
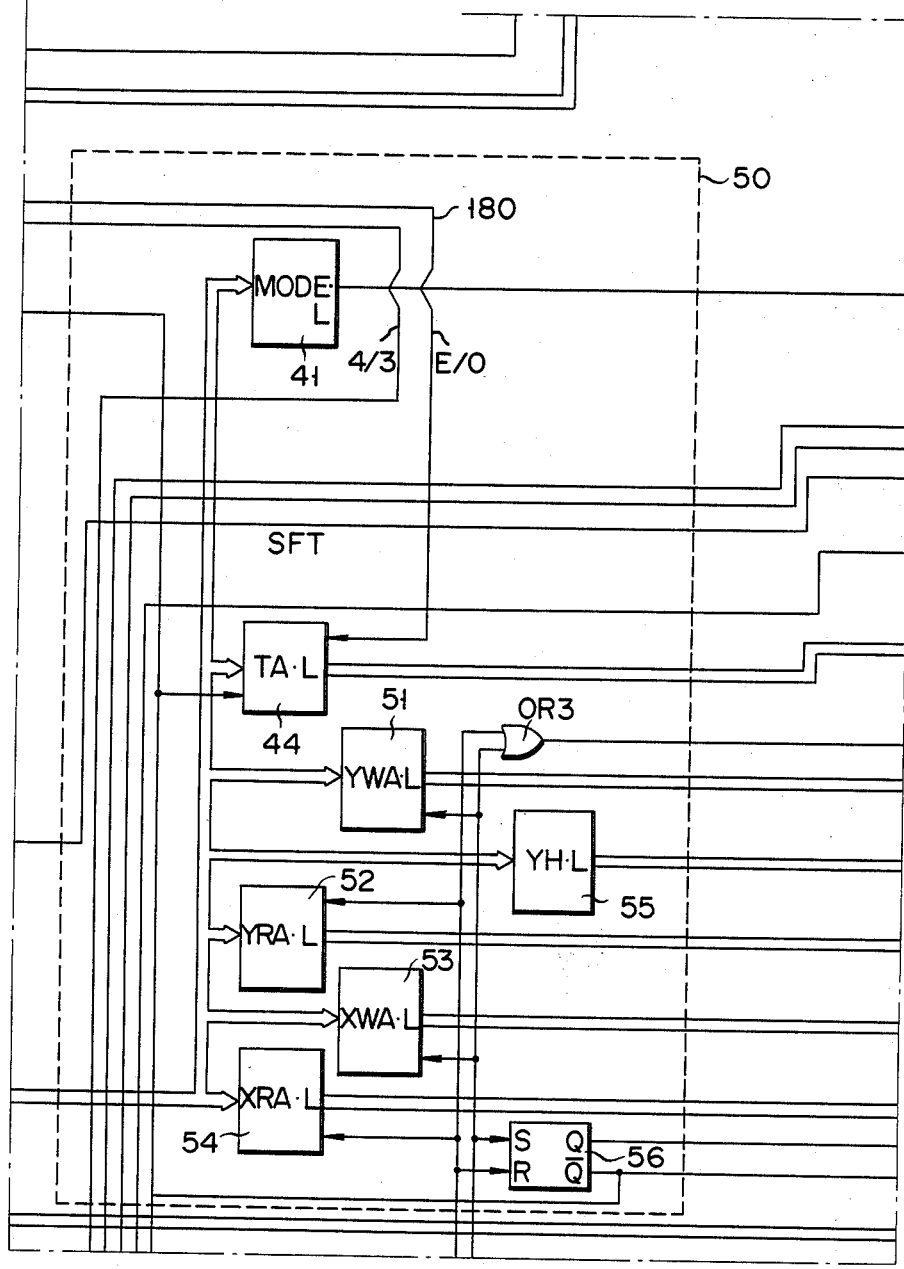
Figure 1D:
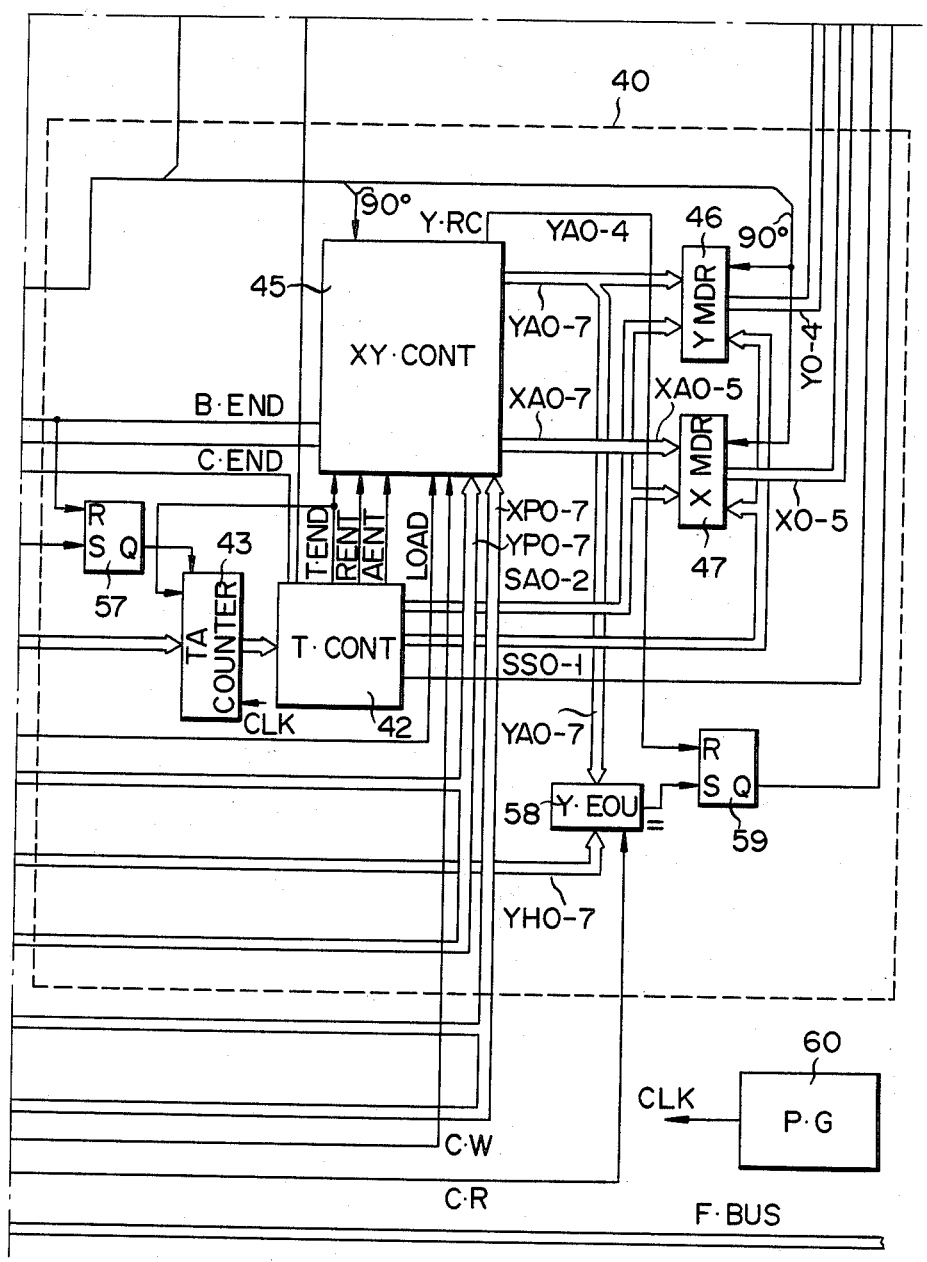
Figure 2:
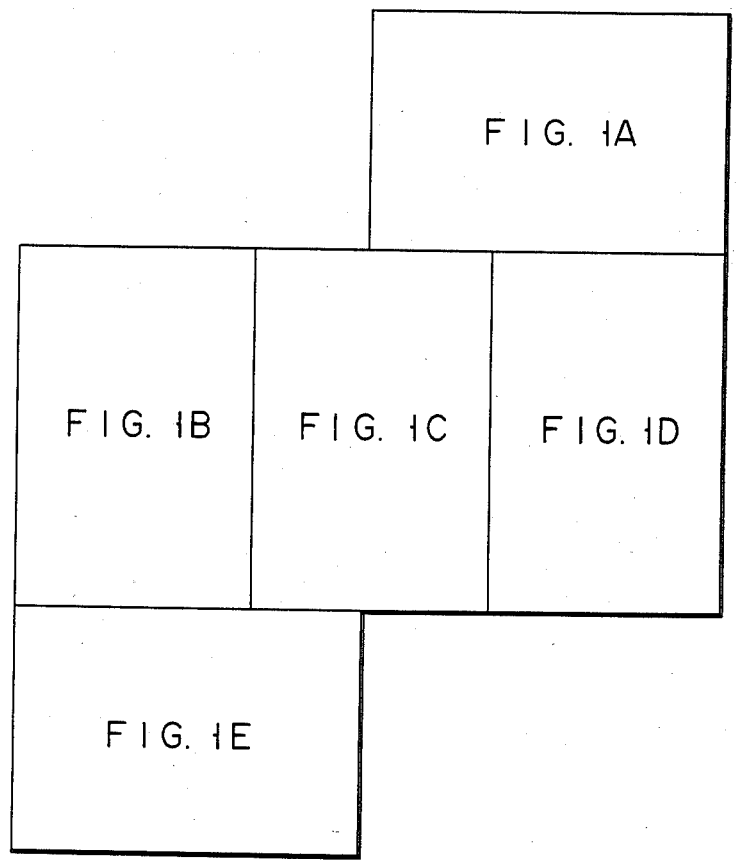
FIG. 2 is a diagram showing the relationship between the components of FIGS. 1A through 1E.

A pattern data conversion processing system according to a preferred embodiment of the present invention will be described with reference to the accompanying drawings. FIGS. 1A through 1E are block diagrams showing the system according to an embodiment of the present invention. More specifically, they show a hardware configuration when the pattern data conversion processing system is applied to a page printer control apparatus. In this embodiment, the page printer control apparatus has a shift selector block 70, a pattern conversion block 30, a pattern conversion control circuit 40 and a pattern conversion parameter setting circuit 50. A central processing unit (CPU) 10 controls the printer control apparatus as a whole. A CPU bus (CPU-BUS) 11 controls data transfer between the CPU 10 and the respective units connected thereto. A DMA bus (DMA-CONBUS) 12 is used for data transfer when a direct memory access (DMA) unit is used. A main random access memory (RAM) (M·RAM) 13 is connected to the CPU 10 through the bus 11 and stores various types of data. A main read only memory (ROM) (M·ROM) 14 is connected to the CPU 10 through the bus 11, and stores control programs shown in the flow charts of FIGS. 4A, 4B, 4C, 28, 30, 34A, 34B, 34C, 34D and 36. An interface (I/F) 15 is connected to the CPU 10 through the bus 11, and controls transfer of printing data and printing control data between the CPU 10 and a host computer (HOST).

A frame memory (F·RAM) 16 has a 1-Mbyte memory capacity and stores one-page image data. The memory 16 is segmented into k×i blocks, each having a predetermined unit memory capacity (to be described in detail later). A frame memory bus (F·BUS) 17 has a 2-byte data width, and the memory 16 is accessed through the bus 17. A page printer 18 prints the data read out from the memory 16 in units of pages. A DMA controller (DMAC) 19 accesses the memory 16 when data is transferred to the printer 18. An address converter (A·CON) 20 receives a read address (DMA address) from the controller 19 and a write address (CPU address) from the CPU 10, and transforms these addresses into units of division blocks of the memory 16. (The converter 20 will be described in detail later.)

A data latch (DI·L) 21 latches one-character code or image data of interest through the interface 15. A character generator (CG·ROM) 22 generates a character pattern corresponding to the character code latched by the latch 21.

A shift register 23 shifts, dot by dot, the dot pattern data generated from the generator 22, or the image data latched by the latch 21, under the control of a shift selector (S·S) 24 and a shift counter 25. In this embodiment, nine 8-bit shift registers SR1 through SR9 are bit-serially connected and used for dot selection (3×3 or 2×2 dot matrix) during pattern conversion, for the buffer during pattern development, and for pattern combination. For example, when 4/3 times elongation conversion for converting the 3×3 dot matrix to the 4×4 dot matrix is performed so as to convert the printing dot matrix size from the 24×24 dot matrix to the 32×32 dot matrix, three slices of 24-dot pattern data generated from the generator 22 are stored in the registers SR1 through SR9. The lower three bits of each of the registers SR3, SR6 and SR9 are supplied as 3×3 parallel data to a data latch 31 of a pattern converter 30

(to be described in detail later). During pattern development for the memory 16, the dot pattern data converted by the pattern converter 30 is stored as bit-serial data in the registers SR1 and SR2, and the write address area data (2 bytes) of the memory 16 is stored as parallel data in the registers SR5 and SR6. These data are superposed for every dot through the selector 24 and an OR gate OR1, and are shifted to the registers SR7 and SR8. The shifted data is then written into the memory 16 through the bus 17.

The shift selector (S·S) 24 selects a shift function (connection configuration) of the register 23. More specifically, when a character read signal (C·R="1") of logic "1" is generated from a flip-flop 56 (to be described later) to indicate the pattern development mode of the memory 16, and an output from an AND gate A0 is set at logic "0" (no 180° conversion is performed), the selector 24 supplies 16-bit dot pattern data from the registers SR1 and SR2 to the registers SR7 and SR8 through the OR gate OR1 in the same order as the input order. However, when the output from the AND gate A0 is set at logic "1" (during 180° conversion), the selector 24 supplies the 16-bit dot pattern data from the registers SR1 and SR2 to the registers SR7 and SR8 through the OR gate OR1 in an order opposite to the input order. The shift counter (S·C) 25 controls shifting of the register 23. The counter 25 receives a shift value "24" and a shift start signal (S·START) from an input/output controller 26, and shifts, for each bit, the data in the registers SR1 through SR9 by 24 bits. At the end of data shifting, the controller 26 generates a shift end signal (S·END) and a shift clock (S·CLK) for 3 or 2 bits in synchronism with a clock (CLK) during the enable period of the shift control signal (SFT) from a controller 42.

The controller (IO·CONT) 26 exchanges various control signals with the CPU 10 and the controller 19, and controls pattern conversion and pattern development of the memory 16. The controller 26 exchanges, with the CPU 10, an initialization control signal (INIT), an initial set end signal (·END); a data set end signal (D·END), for the registers SR1 through SR3 in the register 23; and a data request signal (D·REQ) requesting supply of 24×3 dot data subjected to conversion in the register 23. The controller 26 exchanges, with the controller 19, the INIT signal, the D·END signal for the registers SR5 and SR6 and a data request signal (F·REQ) supplying data from the memory 16 to the registers SR5 and SR6.

The data latch (DATA·L) 31 receives a latch timing signal (C·LT) from the controller 42 and latches either 3×3 dot (D0 through D8) or 2×2 dot (D3, D4, D6 and D7) data from the register 23.

The 3×3 matrix dot pattern data stored in the latch 31 is converted, by a 4/3 times elongation conversion ROM 32, to 4×4 matrix dot pattern data. The converted pattern data is sequentially generated in units of 2×2 matrix division blocks in accordance with 2-bit pattern division addresses (IB·A and IB·B) generated from the timing controller 42 (to be described later).

A gate circuit 33 selectively generates 2×2 bit (i.e., 4-bit data) dot pattern data supplied from the latch 31 when 4/3 times elongation conversion is not performed.

A double elongation/90° conversion ROM 34 is accessed when the x-, y- or x- and y-direction lengths of the character, represented by the dot pattern data generated from the 4/3 times elongation conversion ROM 32 or the gate circuit 33, are doubled, and/or when the character is rotated clockwise through 90°. The ROM 34 sequentially generates 2-bit dot pattern data in accordance with the 3-bit pattern division addresses (DB·A and DB·B) from the controller 42 (to be described in detail later) and the conversion designation data (2y and 90°) generated from a mode latch circuit 41.

A one-character buffer (C·RAM) 35 stores converted one-character dot pattern data. In this embodiment, the matrix comprises 64×64 dots. Each 2-dot pattern data is read/written in accordance with addresses from Y and X address generators 46 and 47 (to be described in detail later) and a memory write enable signal ($\overline{M·WE}$) from the controller 42.

A latch (E·L) 37 latches an even bit (DE) of the converted 2-dot pattern data in response to a bit latch timing signal (B·LT) generated from the controller 42 (to be described in detail later). Similarly, a latch (O·L) 36 latches an odd bit (D0).

An output gate circuit 38 converts the data latched by the latches 36 and 37 and generates bit-serial data. A gate circuit 38 alternately supplies the even and odd bits to the register 23 in response to a gate enable control signal from a flip-flop 59 and either an even bit designation signal (EVN) or an odd bit designation signal (ODD) from the controller 42.

The circuits 31 through 38 constitute the pattern conversion circuit 30.

The mode latch (MODE·L) 41 latches conversion designation data (e.g., 4/3, 90°, 180° and 2y (longitudinal double elongation)) and conversion mode data (e.g., start bit (even/odd) designation data in the read mode of the buffer 35).

The controller (T·CONT) 42 generates a conversion control signal string having a specific timing corresponding to a designated conversion mode. The controller 42 comprises a ROM which generates, in response to an address from a timing address counter 43 (to be described later) and at the timing of the respective types of conversion modes, a scan address (SA0 through SA2) and a scan address select signal (SS0 and SS1) which accesses the buffer 35; the shift control signal (SFT), shifting the data in units of 3 or 2 bits so as to extract 3×3 or 2×2 matrix pattern data from the register 23; the conversion end timing signal (AENT), representing the end of conversion of the dot pattern data (3×3 or 2×2) set in the latch 31; the conversion end timing signal (RENT), representing the end of pattern conversion of one of the divided cycles (one block comprises 2n or 3n cycles) when the dot pattern data (e.g., 24×3 or 16×2) set in the register 23 is given as one block; the one-cycle write end signal (T·END); and the above-described signals (C·LT, IB·A, IB·B, $\overline{M·WE}$, B·LT, ODD and EVN).

The timing address counter (TA counter) 43 designates a ROM address string of the controller 42. The counter 43 continues the count operation throughout the set period of a flip-flop 57 (to be described in detail later). The counter 43 receives the start address set in a cycle start address latch 44 (to be described in detail later) in response to the one-cycle write end signal (T·END).

The latch (TA·L) 44 receives the cycle start address of the controller 42 from the CPU 10 to set the counter 43.

An address controller (XY·CONT) 45 controls the write address (X,Y) and timings of the buffer 35. The controller 45 receives read or write start addresses from latches 51, 52, 53 and 54 (to be described in detail later), 90° conversion designation data from the latch 41, the conversion end timing signals (AENT and RENT) and cycle end signal (T·END) from the controller 42, a load signal (LOAD) from an OR gate OR3 and a character write signal (C·W) from the flip-flop 56 (to be described in detail later), and generates Y and X address (YA0 through YA7 and XA0 through XA7) for accessing the buffer 35, a block end signal (B END), a character end signal (C·END) and a Y count end signal (Y·RC).

The Y address generator (YMDR) 46 receives the Y address (YA0 through YA4) generated by the controller 45, the scan address (SA0 through SA2) and the scan address select signal (SS0 and SS1) which are generated by the controller 42 and the 90° conversion designation data, and generates a one-character buffer 35 Y address (y0 through y4) as a combination of the Y address (YA0 through YA4) and the scan address (SA0 through SA2) in accordance with the contents of the scan address select signal (SS0 and SS1) and the 90° conversion designation data.

The X address generator (XMDR) 47 receives the X address (XA0 through XA5) generated by the controller 45, the scan address (SA0 through SA2) and the scan address select signal (SS0 and SS1) which are generated by the controller 42 and the 90° conversion designation data, and generates a one-character buffer 35 X address (x0 through x4) as a combination of the X address (XA0 through XA4) and the scan address (SA0 through SA2) in accordance with the contents of the scan address select signal (SS0 and SS1) and the 90° conversion designation data.

The circuits 41 through 47 constitute the pattern conversion controller 40.

The address latch (YWA·L) 51 stores a Y write address (YWA) of the buffer 35; the latch (YRA·L) 52 stores a Y read address (YRA); the latch (XWA·L) 53 stores an X write address (XWA); and the latch (XRA·L) 54 stores an X read address (XRA). An address latch (YH·L) 55 stores a character position start address (YH) representing a Y start position of the character pattern developed in the buffer 35. These latches 51 through 55 are reset by the CPU 10 for every one-character processing cycle.

The flip-flop 56 is set in response to a write start address load signal (WA·LOAD) from the controller 26, and reset in response to the read start address load signal (RA·LOAD) from the controller 26. When the flip-flop 56 is set, it generates the character write signal (C·W). However, when the flip-flop 56 is reset, it generates a character read signal (C·R).

The flip-flop 57 is set in response to the block unit pattern conversion start signal (B·START) from the controller 26, and reset in response to the block unit pattern conversion end signal (B·END) from the controller 45. The flip-flop 57 supplies a count operation instruction to the counter 43 during the set period.

An address coincidence detector (Y·EQU) 58 is active in response to the character read signal (C·R="1") from the flip-flop 56. The detector 58 generates a coincidence signal (=) when the Y address value (YA0 through YA7) from the controller 45 coincides with the address value (YH0 through YH7) representing the start position of the pattern data latched by the latch 55.

The flip-flop 59 is set in response to the coincidence signal (=) from the detector 58, and reset in response to a Y count end signal (Y·RC) from the controller 45. The flip-flop 59 supplies a gate enable signal to the gate circuit 38 during the set period.

A clock generator (P·G) 60 generates various timing signals including the clock (CLK).

In response to the character read signal (C·R) from the flip-flop 56 and the 16-bit shift end signal (S·END) from the shift counter 25, an AND gate A1 supplies, to the controller 19, a data preparation end signal (IP·END) indicating that the one-word (16 bits) dot pattern data from the OR gate OR1 has been stored in the registers SR7 and SR8.

An OR gate OR2 controls supply of the initialization control signals (INIT) from the CPU 10 and the controller 19 to the controller 26.

The OR gate OR3 supplies each load signal (WA, LOAD, RA and LOAD) from the controller 26 to the controller 45.

A clear signal (CLR) supplied from the controller 19 through the bus 12 is used to clear the registers SR7 and SR8 after the 16-bit data is read out from the registers SR7 and SR8 in the register 23. A read/write signal R/W is supplied from the controller 19 to the memory 16 in the image data read/write mode.

Figure 3:
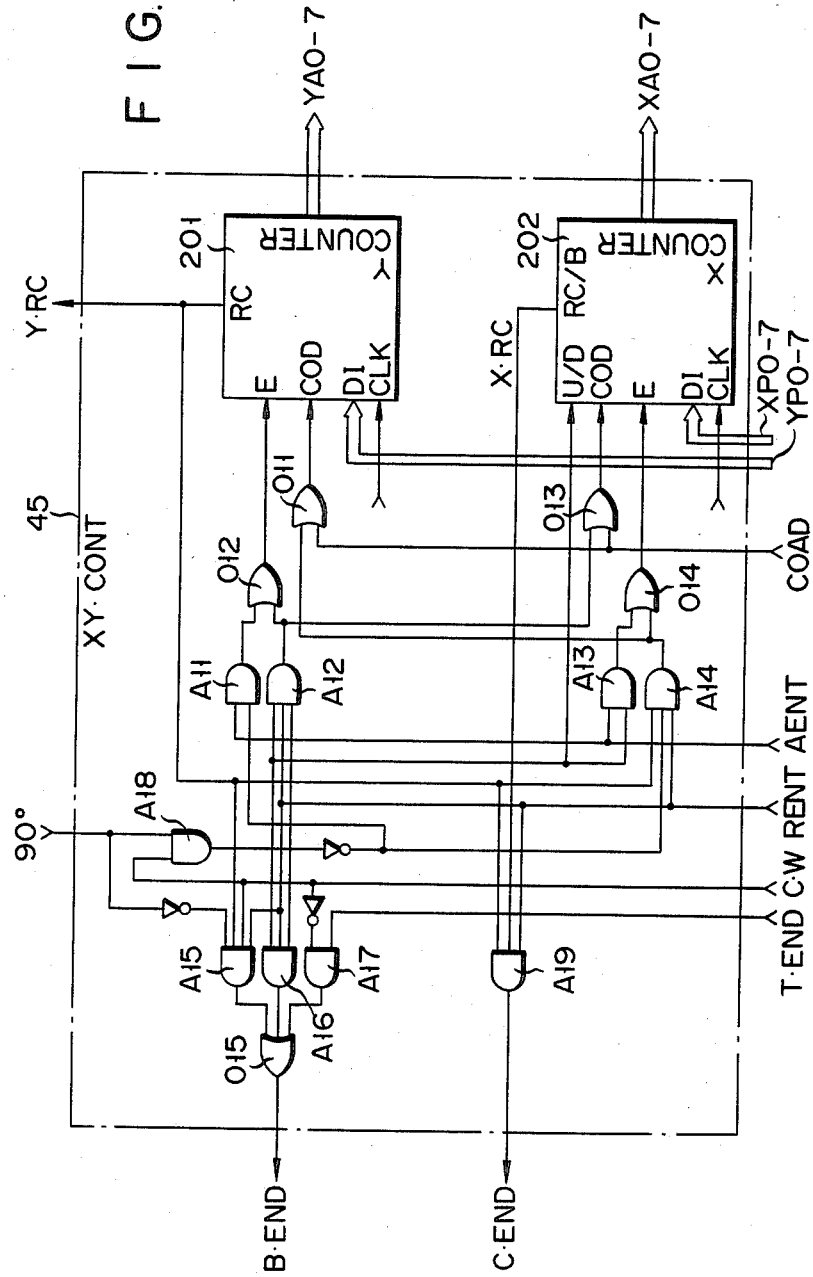
FIG. 3 is a detailed block diagram of an address controller (XY·CONT) 45 shown in FIG. 1D.

FIGS. 3 to 25 are views further explaining the pattern data conversion processing system of FIGS. 1A to 1E. FIG. 3 is a block diagram showing the address controller 45. A Y counter 201 loads a Y read/write address in response to the load signal from an OR gate O11, and starts the count operation in response to an enable signal from an OR gate O12. An X counter 202 loads an X read/write address in response to the load signal from an OR gate O13, and starts the count operation in response to an up/down signal derived from an enable signal from an OR gate O14 and the 90° conversion designation data from an AND gate A18. AND gates A11 and A12 receive the conversion end timing signals AENT and RENT, the 90° conversion designation data and the X count end signal, and generate, together with an OR gate O12, the enable signal to be supplied to the Y counter 201. AND gates A13 and A14 receive the conversion end timing signals AENT and RENT and the 90° conversion designation data, and generate, together with the OR gate O14, the enable signal to be supplied to the X counter 202. AND gates A15, A16 and A17 receive the 90° conversion designation data, the Y count end signal, the character write signal, the conversion end timing signal RENT and the cycle end signal TEND, and generate, together with the OR gate O14, the enable signal to be supplied to the X counter 202. AND gates A15, A16 and A17 receive the 90° conversion designation data, the Y count end signal, the character write signal, the conversion end timing signal RENT and the cycle end signal TEND, and generate the block unit pattern conversion end signal (B·END) together with the OR gate O15. An AND gate A19 receives the Y count end signal, the X count end signal and the conversion end timing signal and generates the character end signal (C·END).

Figure 4B:
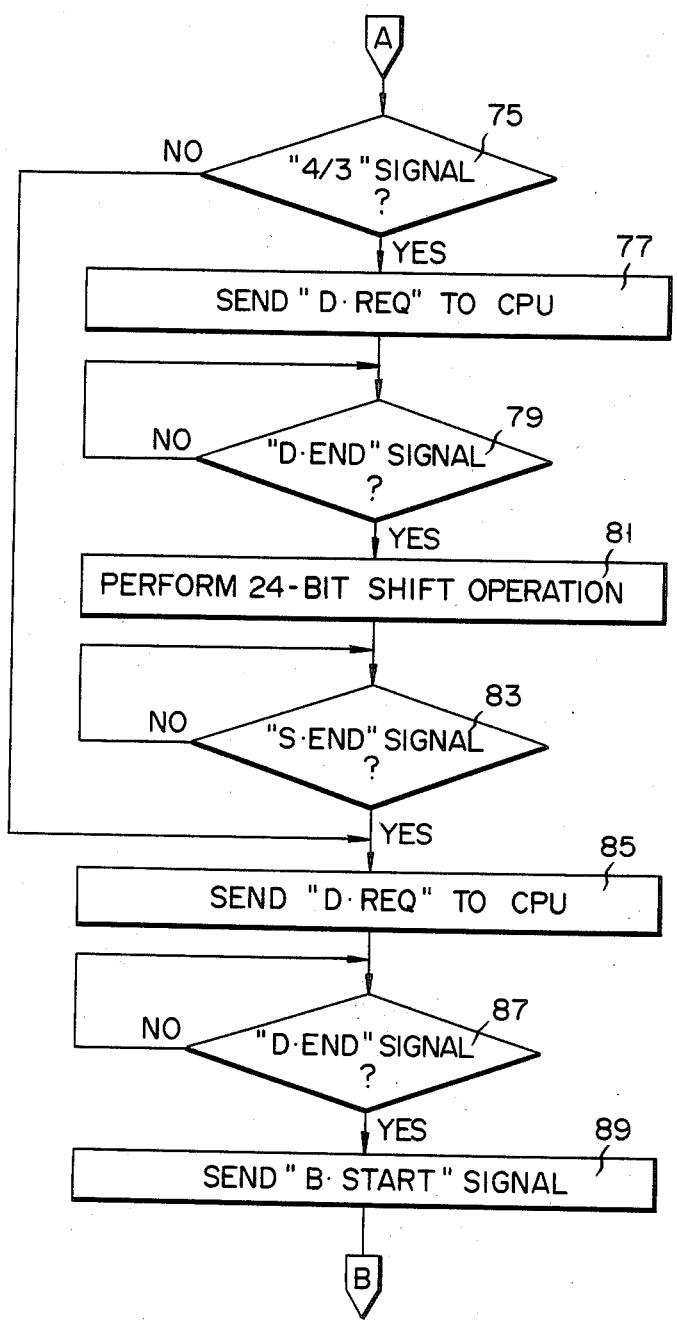
Figure 4C:
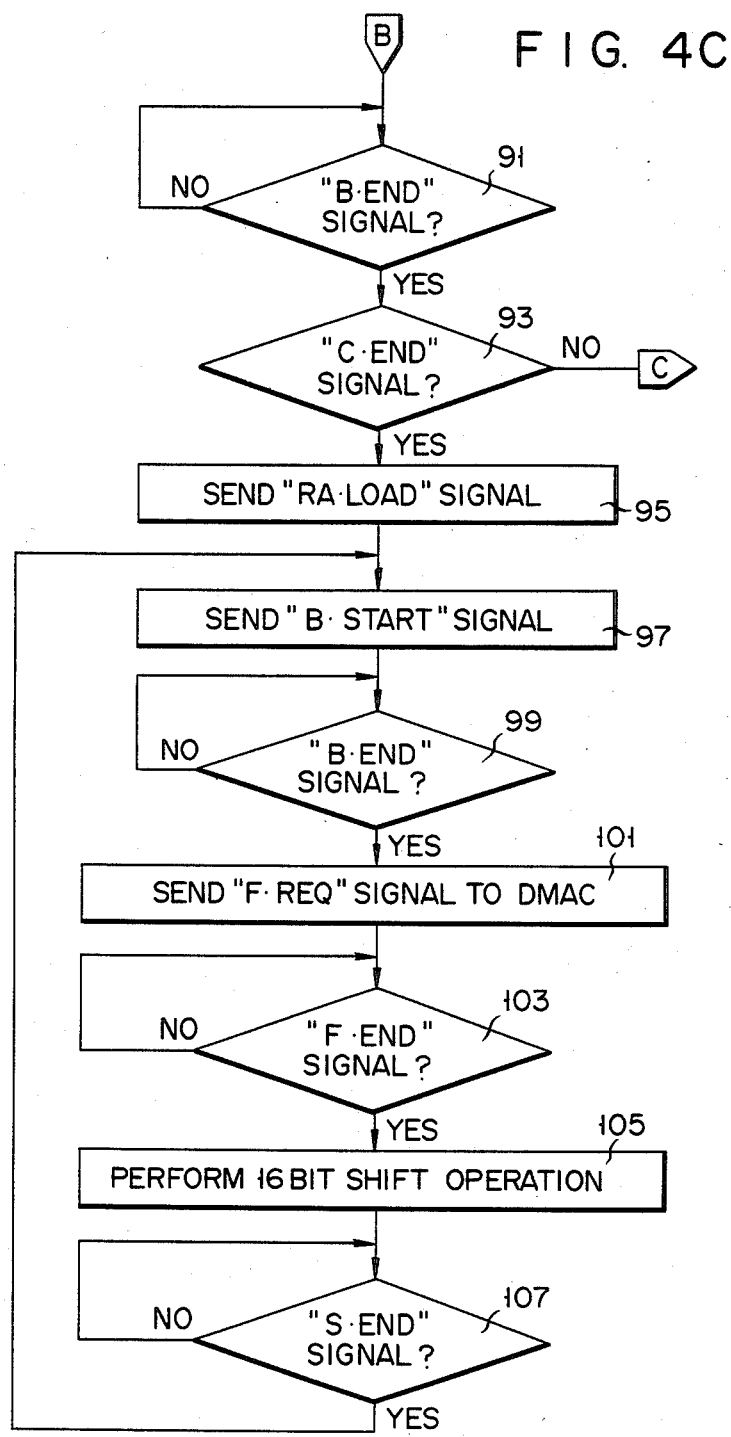

FIGS. 4A through 4C are flow charts showing the operation of the input/output controller 26. (The flow steps will be described later on.)

FIG. 5 is a table showing the relationship between the pattern conversion mode, in accordance with different conversion designation data selectively latched by the latch 41, and the start addresses set in the latches 51 through 55. The dot patterns corresponding to the addresses of FIG. 5 in the buffer 35 are illustrated in FIGS. 19 through 25.

FIG. 6 is a table showing the address bit string (X0 through X5) corresponding to the scan address select signals SS0 and SS1 and the 90° conversion designation data. For example, when the signals SS0 and SS1 are set at logic "0" and no 90° conversion is performed, the scan address signal (SA0 through SA2) from the controller 42 is set in the lower three bits of the generator 47. The X address (XA0 through XA2), generated from the controller 45, is set in the upper three bits of the generator 47.

Similarly, FIG. 7 is a table showing the address bit string (Y0 through Y4) corresponding to the signals SS0 and SS1 and the 90° conversion designation data in the generator 46. For example, when the signals SS0 and SS1 are set at logic "0" and 90°, conversion is performed and the scan address select signal (SA0 through SA2) from the controller 42 is set in the lower three bits of the generator 46. The Y address (YA0 and YA1) from the controller 45 is set in the upper two bits of the generator 46.

Figures 8, 10:
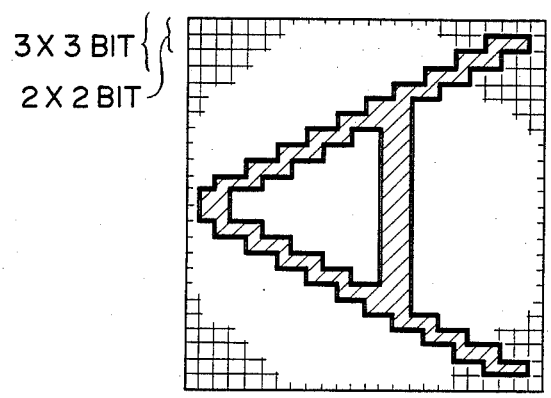
FIG. 8 is an illustrative representation showing a 24×24 dot pattern generated from a character generator ROM (CG ROM) 22, and the extraction patterns thereof.
FIG. 10 is a table showing input/output basic patterns with respect to a double elongation/90° conversion ROM 34 shown in FIG. 1A.

FIG. 8 shows the 24×24 dot pattern generated by the generator 22, and its extraction units. When the 4/3 times elongation conversion is performed, the 24×24 dot pattern is extracted by the register 23 in units of 3×3 dots. However, when 4/3 times elongation conversion is not performed, the 24×24 dot matrix is extracted by the register 23 in units of 2×2 dots.

FIG. 9 shows input/output patterns of the 4/3 times elongation conversion ROM 32. The converted pattern data, i.e., 4×4 dot output pattern data is extracted as 2×2 dot pattern data in response to the pattern divison addresses IB·A and IB·B from the controller 42, resulting in sequential generation of 2×2 dot pattern data.

FIG. 10 shows the input/output basic patterns of the double elongation/90° conversion ROM 34. 2y=1 represents that the Y double elongation is designated; 2y=0 represents that the Y double elongation is not designated; 90°=1 represents that 90° conversion is designated; and 90°=0 represents that 90° conversion is not designated.

Figure 11A:
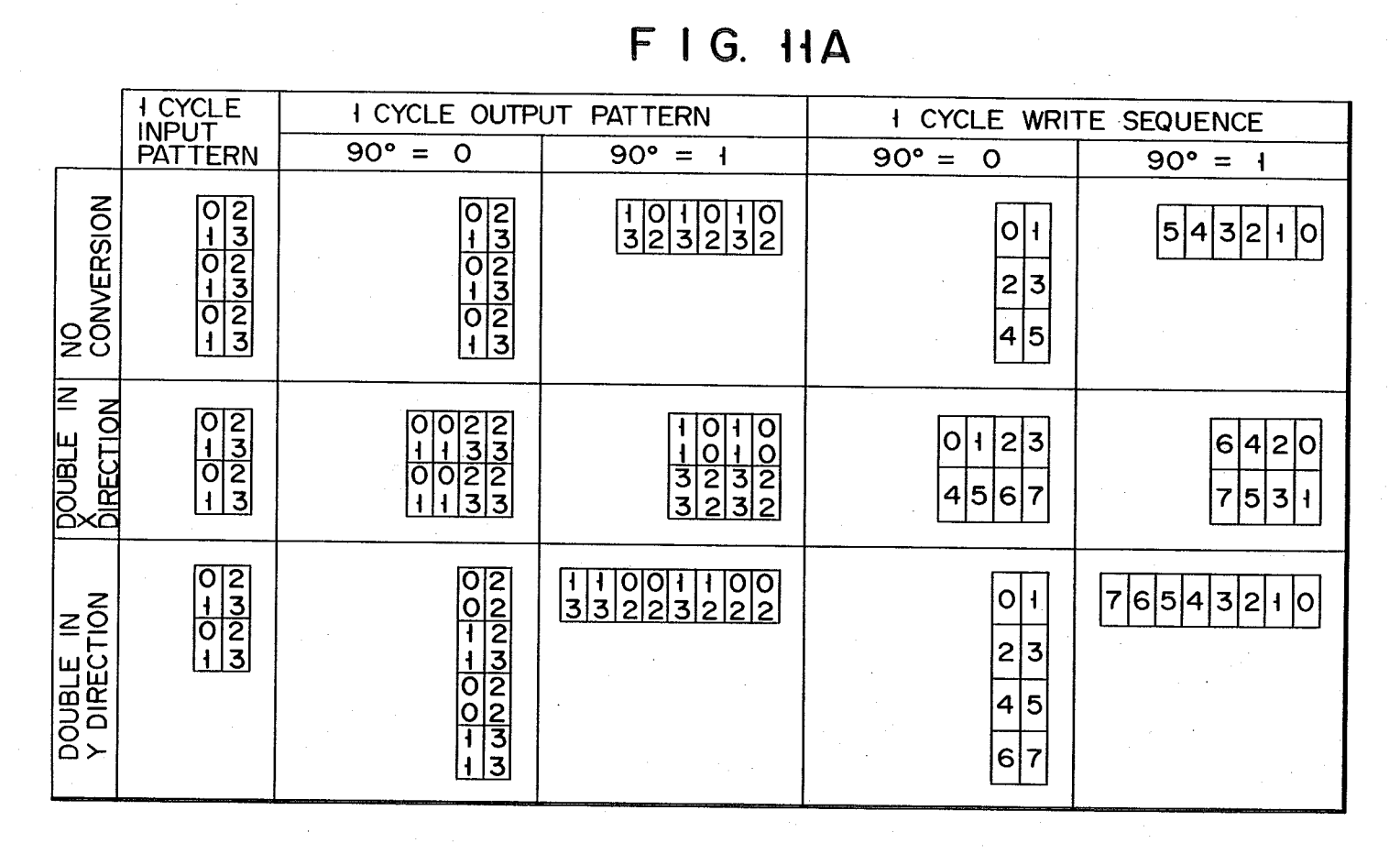

FIGS. 11A and 11B show one-cycle input/output patterns of the respective conversion modes in the double elongation conversion ROM 34.

FIGS. 12A through 12Q, FIGS. 13A through 13Q, FIGS. 14A through 14Q, FIGS. 15A through 15Q, FIGS. 16A through 16Q, FIGS. 17A through 17Q and FIGS. 18A through 18Q show timing signals generated by the controller 42 in the respective pattern conversion modes. The timing charts of FIGS. 12A through 12Q correspond to the character patterns of FIG. 19; the timing charts of FIGS. 13A through 13Q correspond to the character patterns of FIG. 20; the timing charts of FIGS. 14A through 14Q correspond to the character patterns of FIG. 21; and the timing charts of FIGS. 15A through 15Q, FIGS. 16A through 16Q, FIGS. 17A through 17Q and FIGS. 18A through 18Q corresponding to the character patterns of FIGS. 22 to 25.

Figure 20:
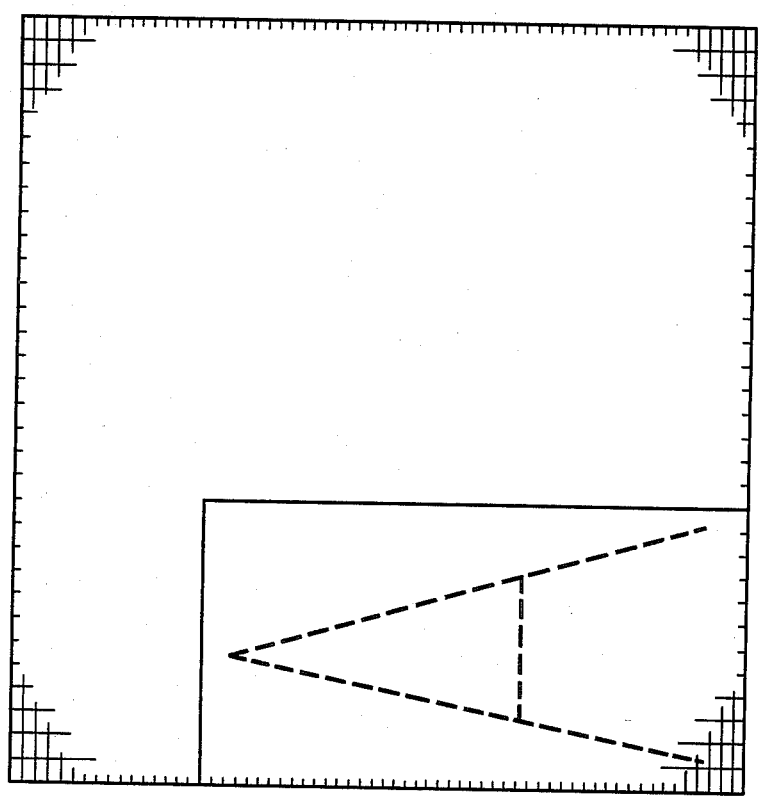
FIG. 20 is an illustrative representation showing a dot development pattern when no rotational conversion is performed, and longitudinal (x direction) double elongation conversion is performed.
Figure 22:
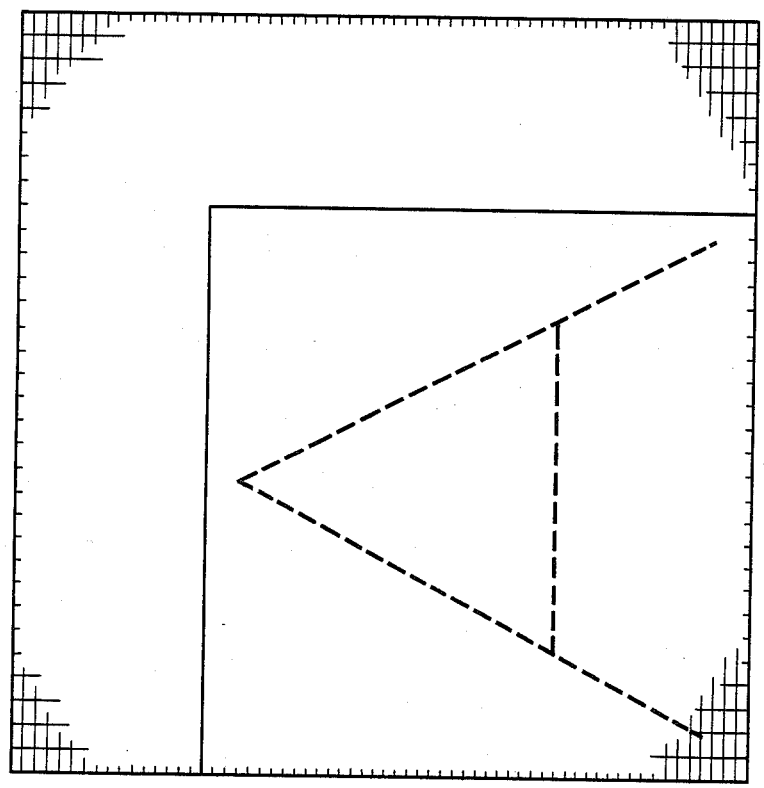
FIG. 22 is an illustrative representation showing a dot development pattern when no rotational conversion is performed and 4/3 times elongation conversion is performed.
Figure 23:
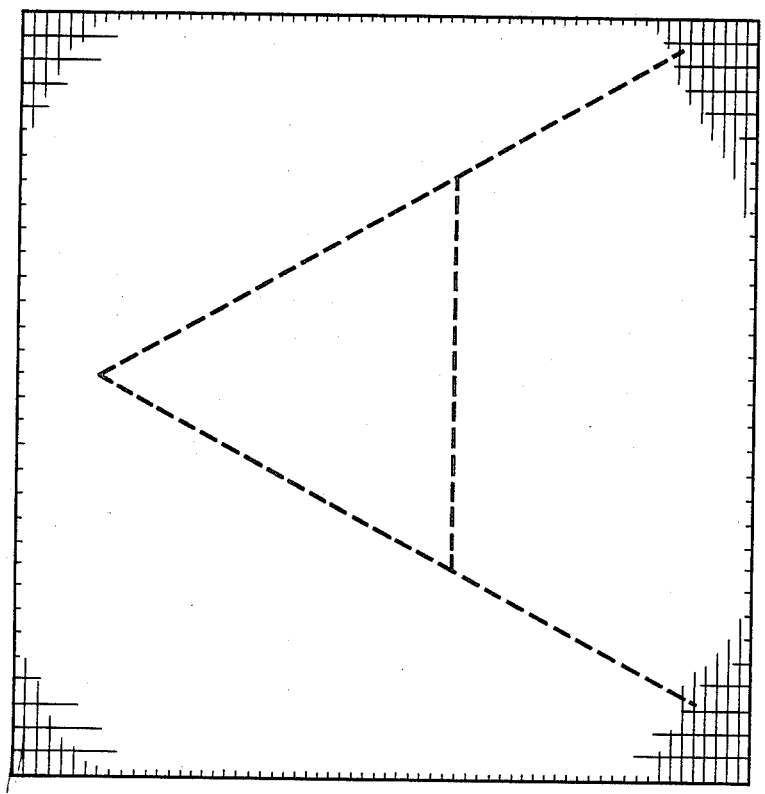
FIG. 23 is an illustrative representation showing a dot development pattern when no rotational conversion is performed, and longitudinal and transverse double elongation conversion, as well as 4/3 times elongation of the entire character are performed.
Figure 24:
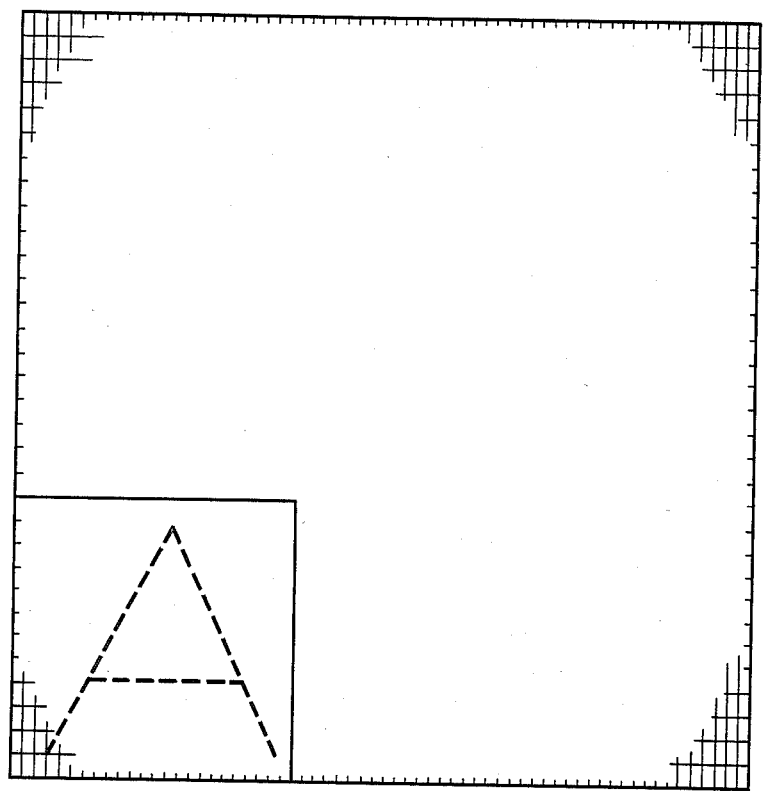
FIG. 24 is an illustrative representation showing a dot pattern when 90° conversion is performed.
Figure 25:
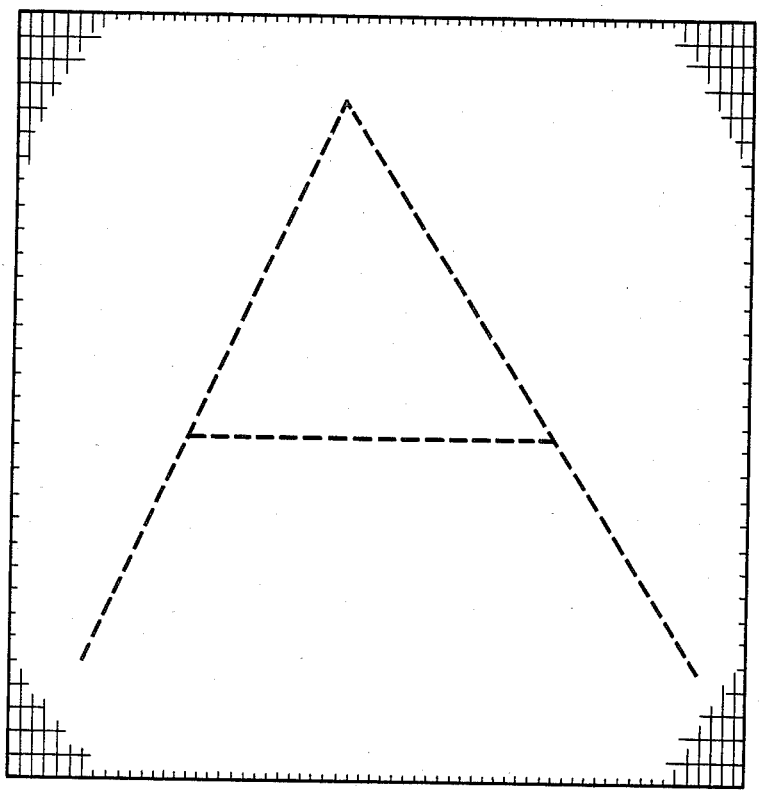
FIG. 25 is an illustrative representation showing a dot development pattern when 90° conversion, longitudinal and transverse double elongation conversion and 4/3 times elongation conversions are performed.
Figure 28:
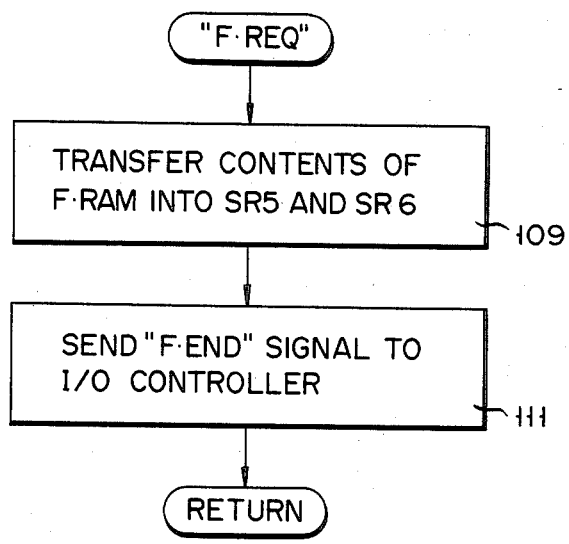
FIG. 28 is a flow chart explaining the operation of a DMA controller 19 shown in FIG. 1E.

FIGS. 19 through 25 show pattern development patterns of the buffer 35. FIG. 19 shows a dot development pattern when no conversion is performed. FIG. 20 shows a dot development pattern when no rotational conversion is performed and longitudinal (x direction) double elongation conversion is performed. FIG. 21 shows a dot development pattern when no rotational conversion is performed and transverse (y direction) double elongation conversion is performed. FIG. 22 shows a dot development pattern when no rotational conversion is performed and 4/3 times elongation conversion is performed. FIG. 23 shows a dot development pattern when no rotational conversion is performed and longitudinal and transverse double elongation conversion, as well as 4/3 times elongation of the entire character are performed. FIG. 24 shows a dot pattern when 90° conversion is performed. FIG. 25 shows a dot development pattern when 90° conversion and longitudinal and 4/3 double elongation conversions are performed. The relationship between the conversion modes, the timing charts and the development patterns is summarized in Table 1 below.

TABLE 1

| Timing Charts and Corresponding Patterns | Conversion Mode | | | |
|---|---|---|---|---|
| | 90° | 4/3 | 2y | 2x |
| FIGS. 12A through 12Q & FIG. 19 | 0 | 0 | 0 | 0 |
| FIGS. 13A through 13Q & FIG. 20 | 0 | 0 | 0 | 1 |
| FIGS. 14A through 14Q & FIG. 21 | 0 | 0 | 1 | 0 |
| FIGS. 15A through 15Q & FIG. 22 | 0 | 1 | 0 | 0 |
| FIGS. 16A through 16Q & FIG. 23 | 0 | 1 | 1 | 1 |
| FIGS. 17A through 17Q & FIG. 24 | 1 | 0 | 0 | 0 |
| FIGS. 18A through 18Q & FIG. 25 | 1 | 1 | 1 | 1 |

The operation of the pattern data conversion processing system will be described with reference to the flow charts of FIGS. 4A through 4C. In order to perform pattern conversion, the INIT signal is supplied from the CPU 10 to the controller 26. Upon reception of the INIT signal, the controller 26 generates the B·START signal to initialize the latch 57 in the controller 40 (step 61). The CPU 10 also sets various conversion instructions such as 4/3, 90°, 180°, 2y and 2x in the latch 41, various start addresses YWR, XWR, YRR, XRR, YH and TA for pattern development in the controller 40 and the corresponding latches 41, 44 and 51 through 55 in the pattern converting parameter setting circuit 50. When initialization is completed, the CPU 10 supplies the initial set end signal (I·END) to the controller 26 so that pattern generation and conversion are started (step 63). In this case, 24×24 dot pattern data corresponding to a kanji code is subjected to 4/3 times elongation conversion and is not rotated. The controller 26 receives the I·END signal from the CPU 10 and generates the start address load signal (WA·LOAD). The flip-flop 56 in the converter 50 is set, and the C·W signal from the flip-flop 56 is supplied to the controller 45. The controller 45 supplies the write start addresses (YWA and XWA) from the latches 51 and 53 to the counters 201 and 202 in the controller 45, respectively. The controller 45 supplies the D·REQ signal to the CPU 10 (steps 65 and 67). When the CPU 10 receives the D·REQ signal, the printing character code (kanji code) and a line number (representing a printing position thereof), which are supplied from the host computer, are latched by the latch 21 through the interface 15 and the bus 11. Thereafter, the CPU 10 supplies the data from the latch 21 to the generator 22.

The generator 22 generates a one-line (24 dots) pattern designated by the line number among 24×24 dot data corresponding to the character code (kanji code) latched by the latch 21. One-line (24 dots) dot pattern data generated from the generator 22 is supplied to the registers SR1 through SR3.

In the registers SR1 through SR9, the one-line (24 dots) dot pattern data from the character generator 22 is supplied as bit-parallel data to the registers SR1 through SR3. As a result, the CPU 10 supplies the D·END signal to the controller 26 (step 69). Upon reception of the D·END signal, the controller 26 shifts the contents of the shift registers SR1 through SR9 by 24 bits in synchronism with the S·CLK signal. The data of the registers SR1 through SR3 is shifted to the registers SR4 through SR6 (step 71). When data shifting is ended, the counter 25 supplies the S·END signal to the controller 26. The CPU 10 determines, in step 73, that data shifting is ended, and the flow advances to step 75. The controller 26 checks, in step 75, whether or not the 4/3 times elongation instruction is present. Since 4/3 times elongation is performed and no rotation of the character is performed in this case to generate a 24×24 dot pattern, the 4/3 times elongation conversion signal latched by the latch 41 is supplied to the controller 26. The controller 26 determines that the 4/3 times elongation conversion instruction is present, and the flow advances to step 77. The operations in steps 77 through 83 are the same as those of steps 67 through 73. More specifically, the next one-line (24 dots) dot pattern data is set in the registers SR1 through SR3, and 24-bit shifting is performed again. The 24-bit data of the first line is stored in the registers SR7 through SR9, and the 24-bit data of the next line is stored in the registers SR4 through SR6. When the controller 26 receives the S·END signal from the shift counter 25, the controller 26 supplies the D·REQ signal to the CPU 10 in step 85. The CPU 10 sets the 24-bit data of the third line in the registers SR1 through SR3. The 3-line (24×3 dots) dot pattern data generated from the generator 22 is thus stored in the shift register 23. Thereafter, the CPU 10 supplies the D·END signal to the controller 26. In step 89, the CPU 10 generates the pattern conversion start signal (B·START) which sets the latch 57 in the controller 40. The set output signal from the flip-flop 57 is supplied as a count operation designation signal to the counter 43. Thereafter, pattern extraction and conversion are performed.

When the counter 43 receives the set signal from the flip-flop 57, it supplies the address latched by the latch 44 as the start address to the counter 43, and then starts address updating of the counter 43 in response to the clock (CLK) throughout the set period of the flip-flop 57.

The ROM incorporated in the controller 42 is sequentially read-accessed in accordance with the address signal from the counter 43. The ROM generates various conversion signals at a timing inherent to the designated conversion mode. The relationship between the conversion modes and the signal timings is shown in Table 1, FIGS. 12A through 12Q, FIGS. 13A through 13Q, FIGS. 14A through 14Q, FIGS. 15A through 15Q, FIGS. 16A through 16Q, FIGS. 17A through 17Q and FIGS. 18A through 18Q. The controller 42 generates the latch timing signal (C·LT), then the pattern division addresses (IB·A, IB·B, DB·A, DB·B and DB·C), the scan address (SA0 through SA2) and the scan address select signal (SS0 and SS1). The C·LT signal is supplied to the latch 31. The pattern division address signals (IB·A, and IB·B) are supplied to the 4/3 times elongation conversion ROM 32, and the pattern division address signals (DB·A, DB·B and DB·C) are supplied to the double elongation conversion ROM 34. The scan address signal (SA0 through SA2) and the scan address select signal (SS0 and SS1) are supplied to the generators 46 and 47.

Upon reception of the latch timing signal (C·LT), the latch 31 latches pattern data of the lower three bits (3×3=9 bits) from the respective registers SR3, SR6 and SR9. The 3×3 bit pattern data is supplied to the ROM 32.

When the ROM 32 receives the 4/3 times elongation conversion designation data from the latch 41, the ROM 32 is set in the read access enable mode. As shown in FIG. 9, the 3×3 dot pattern data from the latch 31 is converted to the 4×4 dot pattern data by the ROM 32 in accordance with the pattern division address (IB·A and IB·B), and is generated four times in the units of 2×2 dot data. The ROM 32 is read-accessed in response to the 3×3 dot pattern data (9-bit data), as the conversion pattern designation address (upper address), and the pattern division address (IB·A and IB·B), as the extraction address (lower address). The ROM 32 generates the converted pattern data corresponding to the input 3×3 dot pattern data four times in units of 2×2 dot pattern data. In this case, the ROM 32 is set in the read access enable mode in response to the 4/3 times elongation designation data from the latch 41, while the gate circuit 33 is set in the output inhibit mode. As a result, the 4/3 times elongated data (4-bit data) is selectively supplied to the ROM 34.

As shown in FIG. 9, the ROM 34 performs double elongation conversion of the input 2×2 dot pattern data in accordance with conversion designation data such as 2y and 90°, and sequentially generates the converted pattern data in response to the pattern division address (DB]A, DB·B and DB·C) in units of 2 bits. The conversion designation data (e.g., 2y and 90°) is used as the conversion pattern designation address (upper address), and the pattern division address (DB·A, DB·B and DB·C) is used as the extraction address (lower address), so that the ROM 34 is read-accessed by the upper and lower addresses. The input 2×2 dot pattern data is converted for double elongation in accordance with the conversion designation data so that the ROM 34 sequentially generates dot matrices each having 2 bits (along the longitudinal direction (Y direction)) in a given order. In this case, when the input data is not subjected to double elongation conversion, the 2×2 dot pattern data is simply extracted without modifying the pattern, sequentially generating 2-dot data. The 2-bit pattern data (DO and DE) from the ROM 34 are sequentially written in the buffer 35.

The buffer 35 receives the memory write enable signal ($\overline{M \cdot WE}$) from the controller 42 and is set in the write mode. In response to the Y address (YA0 through YA4) from the generator 46, and the X address (XA0 through XA5) from the generator 47, 2-bit pattern data (DO and DE) from the ROM 34 are sequentially written into the buffer 35.

The generators 46 and 47 receive the Y and X addresses (YA0 through YA4 and XA0 through XA7) generated by the controller 45, the scan address signal (SA0 through SA2), the scan address select signal (SS0 and SS1) and the 90° conversion designation data which are generated from the controller 42. As shown in FIGS. 5 and 6, the generators 46 and 47 generate write addresses (Y0 through Y4 and X0 through X5) as combinations of the Y and X addresses (YA0 through YA4 and XA0 through XA7), and the scan address signal (SA0 through SA2) in accordance with the contents of the 90° conversion designation data and the scan address select signal (SS0 and SS1).

When the controller 45 receives the LOAD signal from the OR gate OR3 which receives the WA·LOAD signal generated by the controller 26, the Y write start address YWA and the X write start address XWA latched by the latches 51 and 53 are set into the counters 201 and 202, respectively, of FIG. 3. Thereafter, the internal counters in the counters 201 and 202 are counted up/down in response to a ripple carry (RC) and the conversion end timing signal (AENT) in accordance with the conversion mode. At the same time, the block end signal (B·END) is generated for every pattern conversion stored in the registers SR1 through SR9, and the C·END signal is generated for every one-character pattern conversion. The detailed arrangement of the controller 45 is shown in FIG. 3, and the relationship between the start addresses and the conversion modes is shown in FIG. 5.

The controller 42 generates the T·END signal for every one-cycle pattern conversion, the AENT signal for every cycle of the scan address (SA0 through SA2) and the RENT signal for every one-cycle pattern conversion. These output signals are supplied to the controller 45 and are used for internal counter control and generation of the B·END and C·END signals. The T·END signal is supplied to the counter 43, and the start address, held in the latch 44 is set into the counter 43, so that the controller 42 generates the above-mentioned signals for performing one-cycle pattern conversion. The SFT signal from the controller 42 causes the 3-bit S·CLK signal to be generated by the counter 25 in response to the CLK signal, thereby generating the next 3×3 dot pattern data from the register 23. This dot pattern data is latched by the latch 31 in response to the C·LT signal from the controller 42, and the same operation as described above is repeated.

The controller 26 repeats the operations in steps 67 through 93 for every B·END signal until it receives the C·END signal. By such repetition, eight one-block patterns, each corresponding to 24 dots×3 lines, are stored as data of 24 dot×24 line pattern data in the register 23. When all pattern processing is completed, the one-character dot pattern data converted in accordance with the conversion designation data is stored in the buffer 35. The relationship between the conversion modes and the patterns is illustrated in Table 1 and FIGS. 19 through 25.

When a one-character dot pattern is developed in the buffer 35, the C·END signal from the controller 45 is supplied to the controller 26. The controller 26 generates the RA·LOAD signal (step 95 in FIG. 4C) to thereby reset the flip-flop 56. As a result, the flip-flop 56 generates the character read signal (C·R), and the developed pattern is read out from the buffer 35 and written into the memory 16. In this case, the reset flip-flop 57 is set again by the B·START signal. The C R signal is supplied, together with the start bit designation data (E/O), to the latch 44. The controller 42 generates various signals to read data from the buffer 35 (step 97 in FIG. 4C). The $\overline{M \cdot WE}$ signal designates the read mode, and the bit latch timing signal (B·LT) and the even/odd bit designation signal (EVN/ODD) are generated. The output timings of the EVN/ODD signals designated by the E/O data are illustrated in FIGS. 26A through 26H and FIGS. 27A through 27H. The continuous read address is generated by the controller 45 to read-access the buffer 35. 2-bit readout data is latched by the latches 36 and 37, and the latched data are alternately gated through the output gate circuit 38. The readout 16-bit (one word) data is supplied as the bit serial data to the registers SR1 and SR2 in the register 23 while the 16-bit S·CLOCK signal is being supplied to the register 23. When one-word shifting is completed, the block end signal (B·END) is supplied to the controller 26, and the frame memory data request signal (F·REQ) is supplied to the controller 19 (steps 99 through 101 in FIG. 4C).

When the controller 19 receives the F·REQ signal from the controller 26, the controller 19 accesses a character write area of the memory 16. The data in this area is read out in units of words (16 bits), and the readout one-word data is set in the registers SR5 and SR6 in the register 23. This operation will be described with reference to the flow of FIG. 28. In step 109, the contents of the memory 16 are transferred to the registers SR5 and SR6. In step 111, the F·END signal is supplied to the controller 26.

Figure 29:
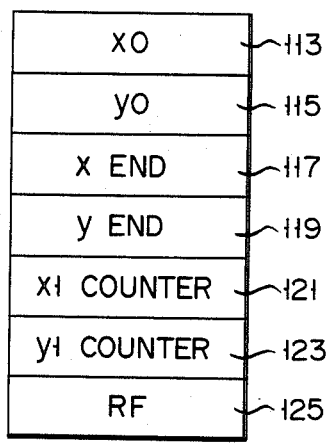
FIG. 29 is a data format showing counters and registers in the DMA controller 19.

FIG. 29 shows counters and registers arranged in the controller 19. Referring to FIG. 29, x0 and y0 registers 113 and 115 store initial values (addresses representing the pattern write start positions on the memory 16) preset by the CPU 10; xEND and yEND 117 and 119 registers store end values set by the CPU 10; x1 and y1 counters 121 and 123 are incremented or decremented in accordance with the write access; and a read flag (RF) 125 (read indication flag) shows that the memory 16 is set in the read mode.

One-word (16 bits) pattern data read out from the buffer 35 is stored in the registers SR1 and SR2 in the shift register 23. The one-word (16 bits) pattern data written in the write area of the memory 16 is stored in the registers SR5 and SR6. When the F·END signal is supplied to the controller 26 (step 103 in FIG. 4C), the shift register 23 is shifted by one word, and the pattern data stored in the registers SR1 and SR2 is superposed, by the OR gate OR1, on the pattern data stored in the registers SR5 and SR6. The superposed data is shifted to the registers SR7 and SR8. In this case, the shift selector 24 causes the registers SR1 and SR2 to sequentially generate the pattern data in response to a switching control signal, consisting of the C·R signal, when the 180° conversion designation data is not present. The readout pattern data is supplied to the OR gate OR1. However, when the 180° conversion designation data is present, the output from the AND gate A0 is set at logic "1". The pattern data stored in the registers SR1 and SR2 are read out in an order opposite to the input order and in response to the switching control signal so that the readout pattern data are sequentially supplied to the OR gate OR1.

Figure 30:
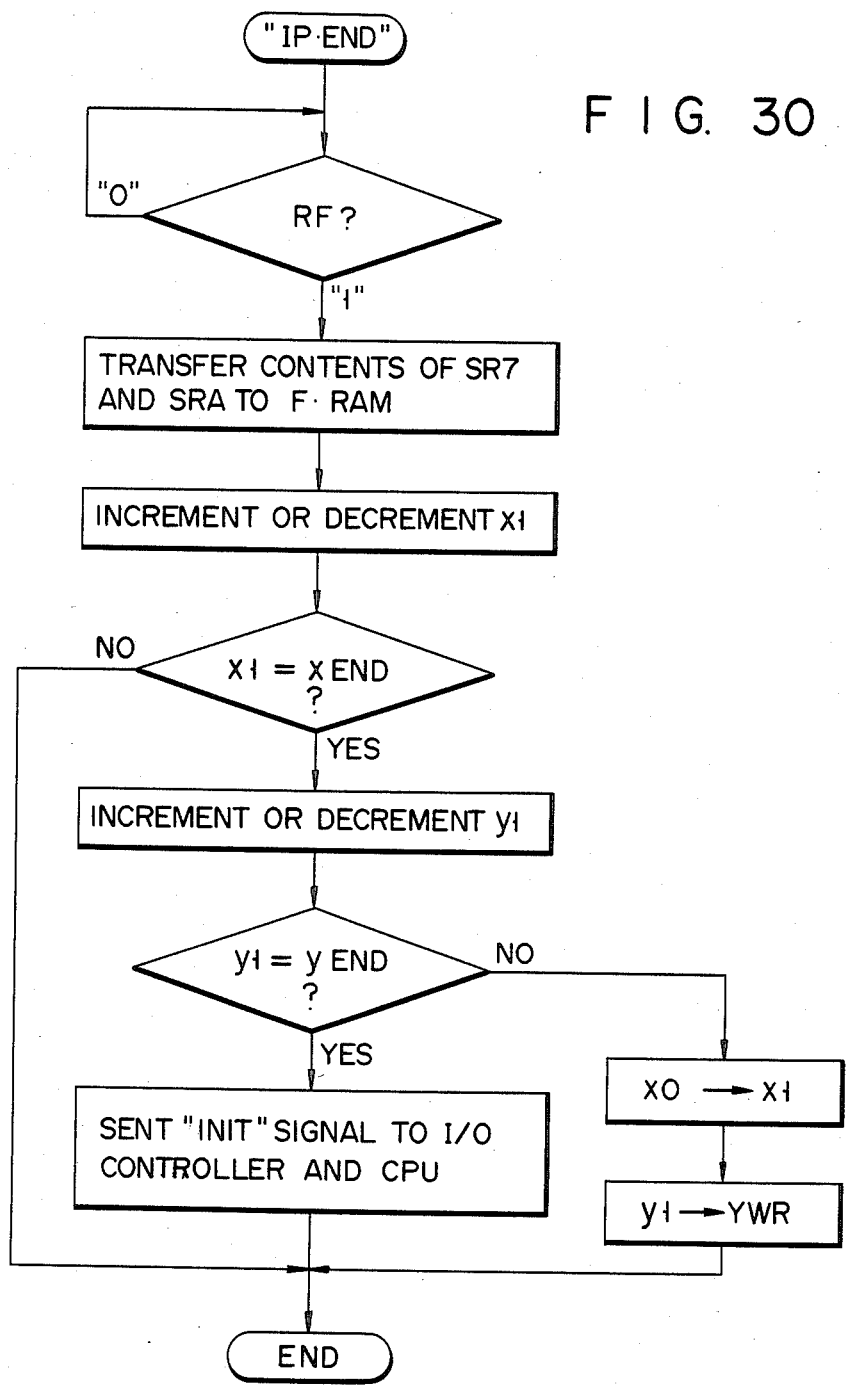
FIG. 30 is a flow chart explaining the operation of the DMA controller 19.
Figure 31:
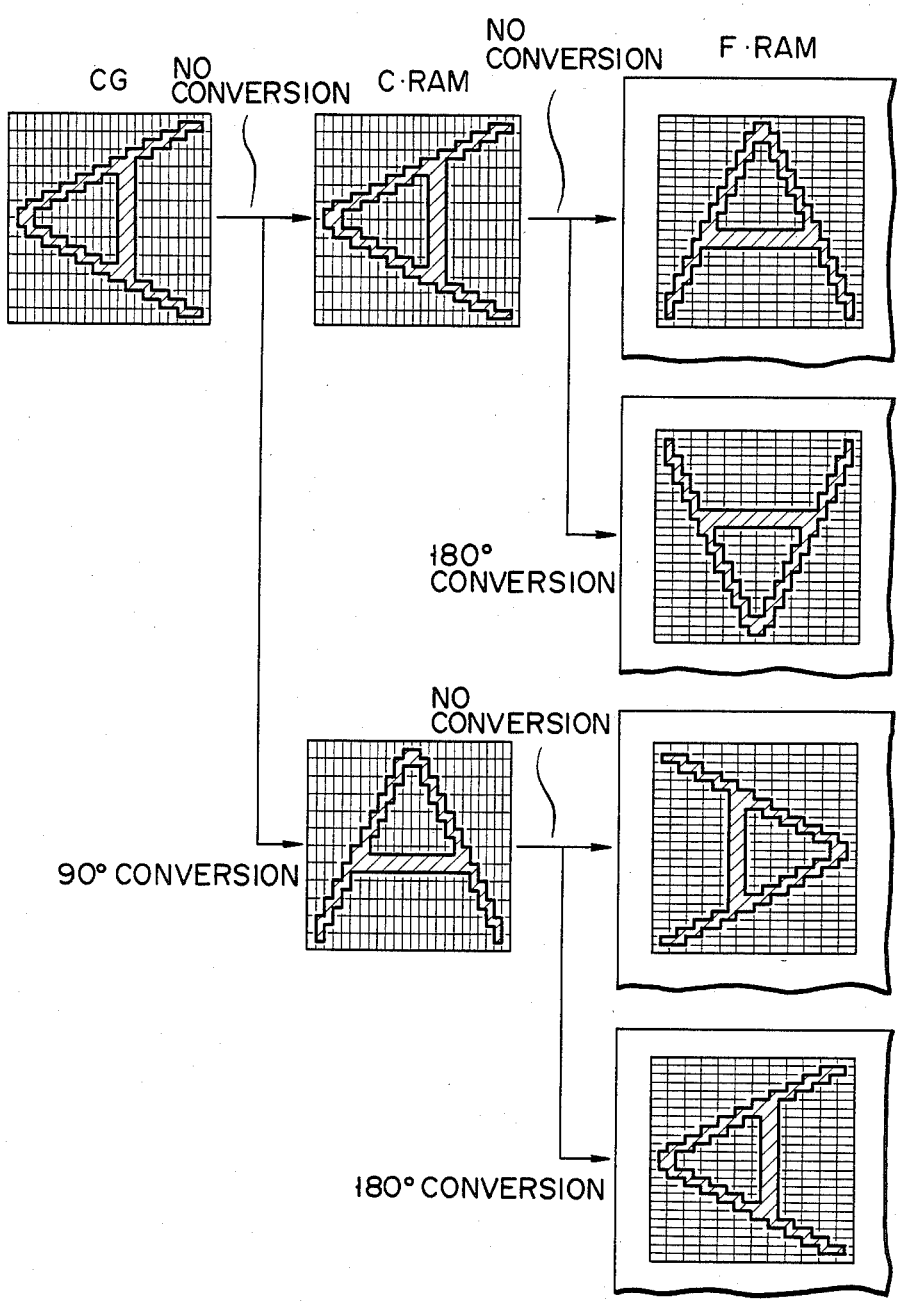
FIG. 31 is a general representation showing pattern rotation procedures in the system of FIGS. 1A to 1E.

The operation flow of FIG. 30 is performed by the controller or DMAC 19 every time the IP·END signal is supplied thereto. The one-word logical OR pattern data held in the registers SR7 and SR8 in the shift register 23 is written in the memory 16 in response to the address signal generated from the DMAC 19 through the converter 20. The orientations of the patterns due to the presence and absence of 180° conversion are illustrated in FIG. 31.

One-word writing for the memory 16 is achieved by writing in units of one-character data (steps 99 through 107 in FIG. 4C).

The memory 16 is divided into a plurality of blocks along the row and column directions of a memory area (1 Mbyte). The memory area corresponds to X·Y=2304×3584 dots, and each block corresponds to X·Y=256×512 dots so that the memory area has X·Y=9×7 blocks.

Figure 32A:
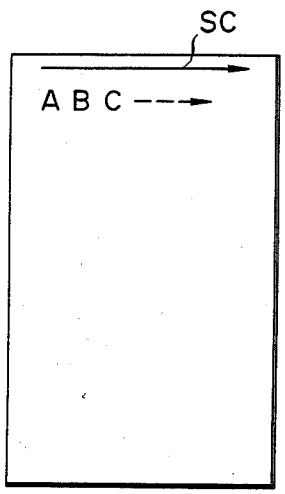
FIGS. 32A through 32D are representations showing printing formats.
Figure 32B:
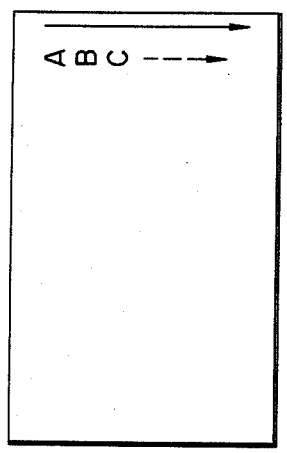
Figure 32C:
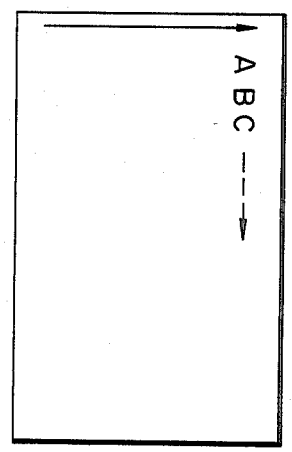
Figure 32D:
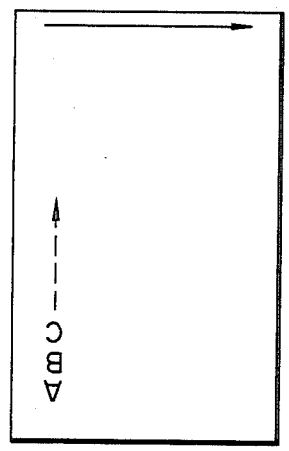

The converter 20 for converting the read/write address of the memory 16 has a function for converting both the write address signal supplied from the CPU 10 to the memory 16, and the read address signal supplied from the memory 16 to the printer 18 in a specific block string cycle of 8 pages (0 through 7). Such address conversion is performed by an address conversion ROM. In other words, the converter 20 has a page designation means for advancing the write page one page ahead of the read conversion page. By providing such a block address conversion mechanism, even if the read/write and directions of the image data are perpendicular to each other with respect to the memory 16, as shown in FIGS. 32C and 32D, the next image data can be written in the read end area while one-page image data is being transferred to the printer 18.

Format printing and index printing will be described with reference to FIGS. 34A through 38D.

When one-page printing image data is developed in the memory 16, the write page area is initialized, and format initialization is performed. The value corresponding to the format to be printed is set by retrieving the initial value table TBL of FIG. 33. When one-page data is transferred, format designation data FORM for designating one of formats 1 through 8, index designation flag data INDEX which is set at logic "1" in the index mode, index write position data IN·AR representing the write start address on the memory 16, and index data IN·DATA are set in predetermined registers in the main RAM 13.

When the printing data, e.g., the character code is supplied together with the printing control data to the interface 15, the conversion designation data such as 4/3 times elongation, 90° conversion, double elongation, and inversion data are selectively latched by the latch 41 before the input character code is converted. After the character code is latched by the latch 21, the write area of the frame memory 16 is checked and discriminated. In this case, when the printing formats are given in FIGS. 32C and 32D such that the read direction of the image data is different from the write direction, a predetermined write enable area is checked and guaranteed. The specific block address in the memory 16 is converted, and the I·END signal is generated. The pattern conversion is then started.

When one-character pattern conversion ends and the CPU 10 receives the INIT signal from the controller 19, as shown in FIGS. 34A through 34D, format discrimination is performed under the control of the CPU 10. The converted character pattern data in the memory 16 is developed in accordance with the designated format.

Figure 34A:
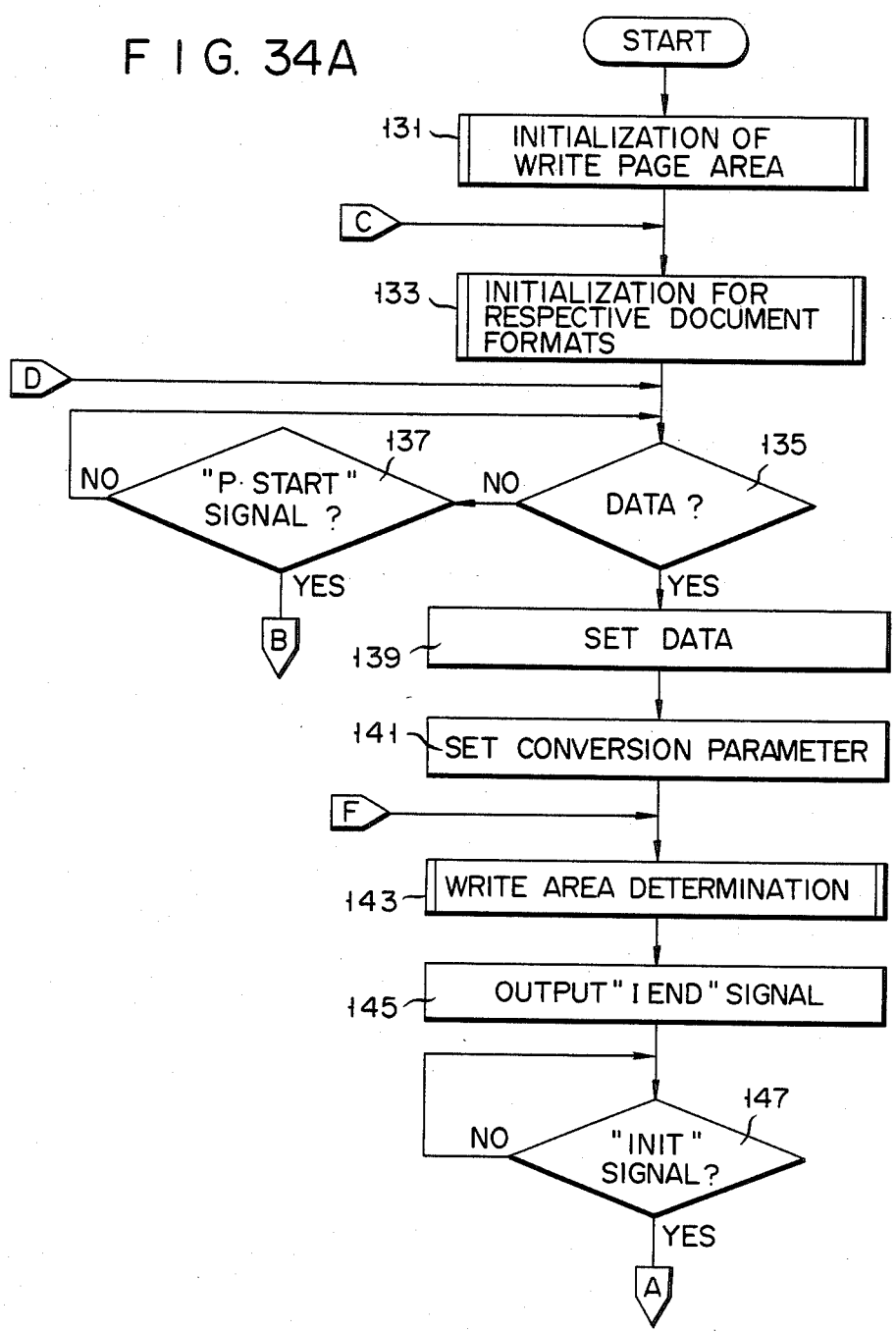
Figure 34C:
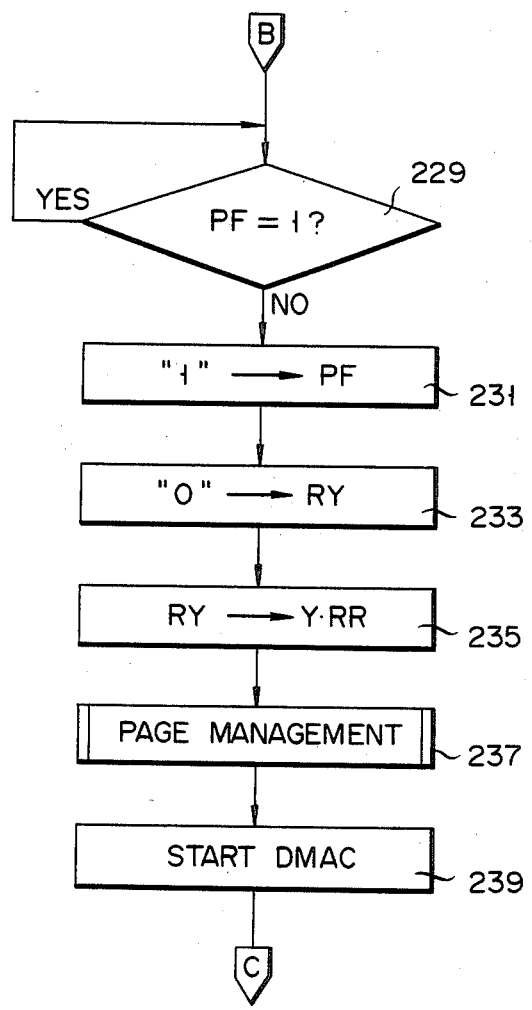
Figure 34D:
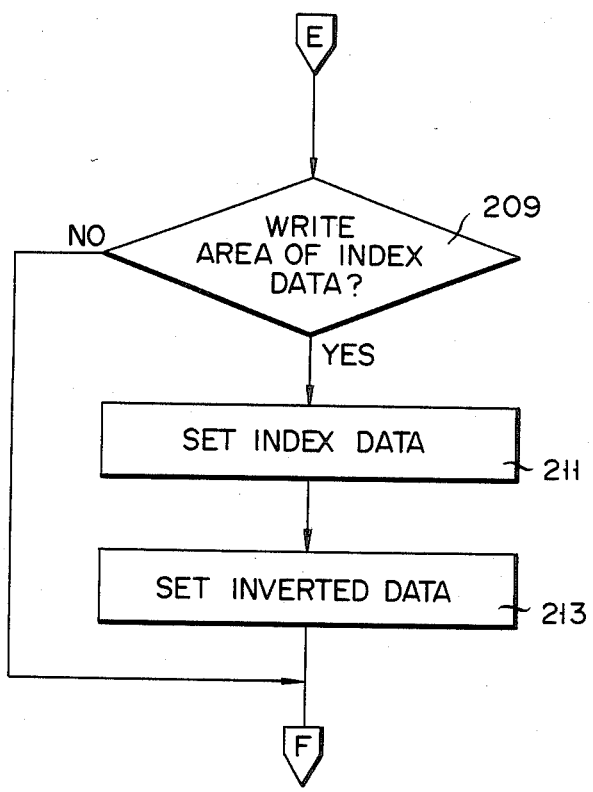
Figure 35A:
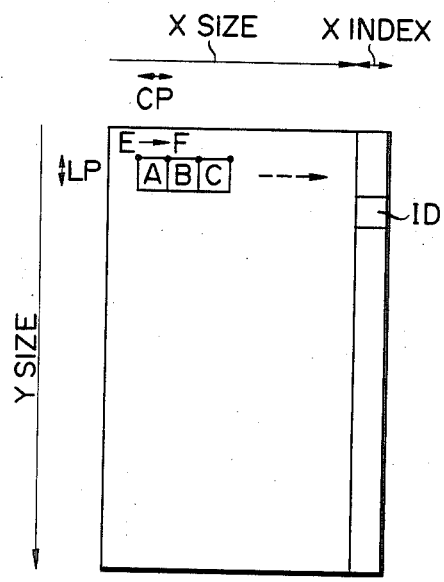
FIGS. 35A through 35D are representations showing format patterns in the frame memory in the system shown in FIGS. 1A to 1E.
Figure 35B:
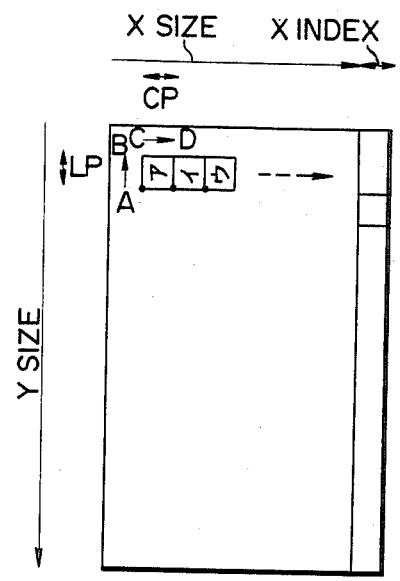
Figure 35C:
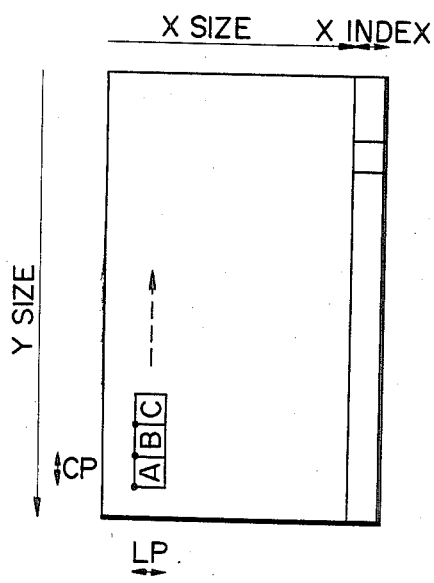
Figure 35D:
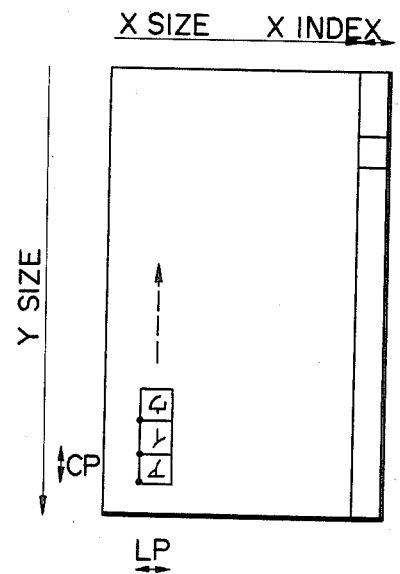

When the format is discriminated as format 1, the pattern development showing the character orientation direction shown in FIG. 35A is performed. When format 2 is designated, the pattern development along the character orientation direction shown in FIG. 35B is performed. The pattern development along the character orientation direction shown in FIG. 35C or 35D is performed when format 3 or 4 is selected. The memory address control of formats 1, 2, 3 and 4 will be described in detail with reference to the flow charts of FIGS. 34A through 34D and the formats of FIGS. 35A through 35D.

In step 131 of FIG. 34A, a write enable area (a maximum area of one page at initialization), a write page and a read page are set in predetermined working registers. In step 133, the format initial values corresponding to the designated format are set in the latch 41 and the registers of the controller 19. Step 135 is executed to determine whether or not the data to be printed is set in the main RAM 13. When the CPU 10 determines, in step 135, that data is not present and, in step 137, that a print start instruction (P·START) is supplied from the host computer, the DMA transfer flow in steps 229 through 239 is initiated. However, if YES in step 135, one-character data, as the data to be written (i.e., data to be converted) and stored in the RAM 13, is set in the latch 21. In step 141, the address data is set in the latches 51 through 55, and various conversion parameters are set in the latch 41. Both the INIT signal and a control signal to perform pattern conversion are supplied to the controller 26. The CPU 11 checks, in step 143, whether or not the area for receiving the data has completed printing. Until printing is completed, the area waits to store the data.

When the CPU 10 determines that the area is empty, the CPU 10 generates the I·END signal in steps 145 through 147 and waits until the controller 19 generates the INIT signal. When the controller 19 causes the memory 16 to store one-character data, it generates the INIT signal. In step 147, when the INIT signal is detected, one of formats 1 through 4 is selected in step 149. When format 1 is identified in step 149, the address data XADR of the CPU register is updated by CP of FIG. 35A, i.e., one-character size. The CPU 10 then checks whether or not an updated address exceeds the page size (X size) of the one-page area of FIG. 35A. If YES in step 153, the CPU 10 checks, in step 155, whether or not the updated address falls within the index area. If YES in step 155, the CPU 10 then checks in step 157 whether or not the index mode is designated.

If YES in step 157, the CPU 10 checks, in step 209, whether or not the address data (YADR) of the CPU register represents the index data write area. If YES in step 209, the index data prestored in the RAM 13 is set in the latch 21 in step 211. In step 213, the inversion designation signal is set in the latch 41 and the flow returns to step 143 so that pattern development can be performed.

However, if NO in step 157, the address data XADR in the CPU register is initialized in step 159. The address data (YADR) of the CPU register is updated by LP of FIG. 25A, i.e., one-character size. In step 161, the CPU 10 determines that the one-page write operation is completed in accordance with the updated address data YADR. As indicated by the black dots of each character of FIG. 35A, the start address of each character has a value obtained by subtracting the one-character size LP from the Y size along the Y size updating direction (i.e., a direction indicated by the dotted line). As shown in step 161, one-page write end is determined by "YADR>Y size−LP".

When the CPU 10 determines, in step 161, that one-page writing is not completed, the flow returns to step 135.

When the CPU 10 determines, in step 161, that one-page writing is completed, the CPU 10 checks, in step 229, whether or not a "printing" indication flag PF is set at logic "1". When printing is completed and the flag RF is reset to logic "0", the flag RF is set again in step 231. In step 233, the read line address RY is initialized to "0". In step 235, the address RY is transferred to the Y read address register in the converter 20. In step 237, the write and read pages are updated, and then the controller 19 is started in step 239. The flow returns to step 133.

When format 2 is determined in step 149, the address data XADR of the CPU register is updated by one-character size, i.e., CP in step 171. The CPU 10 checks, in step 173, whether or not the updated address data XADR is larger than a value obtained by subtracting one-character size from the page size; one-character size being subtracted from the page size because the characters are printed along the A-B and C-D directions. When one character is not completely written, it is impossible to determine that this character falls within the index area. For this reason, the value obtained by subtracting one-character pitch from the X size is compared with the address XADR. In step 173, the CPU 10 determines whether or not the address data XADR exceeds the page size (X size−CP). If YES in step 173, the CPU 10 checks, in step 175, whether or not the value falls within the index area. When the CPU 10 determines that the value falls within the index area, the CPU 10 checks, in step 177, whether or not the index mode is set.

If YES in step 177, steps 209, 211 and 213 are executed, and the flow returns to step 143, as described above. However, if NO in step 177, the address data XADR of the CPU register is initialized in step 179, and the address data YADR of the CPU register is updated by one-character size, i.e., LP of FIG. 35B. The CPU 10 then checks, in step 181, whether or not one-page writing is completed in accordance with the updated address data YADR. As indicated by a black dot in the area of each character of FIG. 35B, the CPU 10 checks whether or not the start address of each character is larger than the Y size along the Y size updating direction (indicated by a dotted arrow). If YES in step 181, the flow returns to step 135.

When format 3 or 4 is determined, in step 149, the address data YADR of the CPU register is set at a value obtained by subtracting one-character size from the current address data YADR. The CPU 10 checks, in step 193, whether or not the updated YADR is smaller than the one-character size. If YES in step 193, line return is performed in step 195 to set the YADR to Y size. The CPU 10 checks, in step 197, whether or not the updated address data XADR is larger than a value obtained by subtracting a one-line sentence from the page size. When the address data XADR is determined, in step 197, to exceed (X size−LP), the CPU 10 checks, in step 199, whether or not the value falls within the index area. If YES in step 199, the CPU 10 checks, in step 201, whether or not the index mode is set.

When the CPU 10 determines that the index mode is set, operations in steps 209, 211 and 213 are performed and the flow returns to step 143, as described above. However, if NO in step 201, the operations in steps 229 through 239 are performed, and the flow returns to step 133.

In the format processing of FIGS. 3A through 34D, the CPU checks whether or not the index mode is set. When the CPU 10 determines that the index mode is not set, i.e., when the index flag is not set at logic "1", the flag PF is set after one-page pattern development end is determined. Thereafter, the page management of the write and read pages is performed, and the controller 19 is started. As a result, the image data shown in FIGS. 35A through 35D are transferred to the printer 18 in accordance with the formats written in the memory 16. The transferred data are then printed out at the printer 18.

Figure 36:
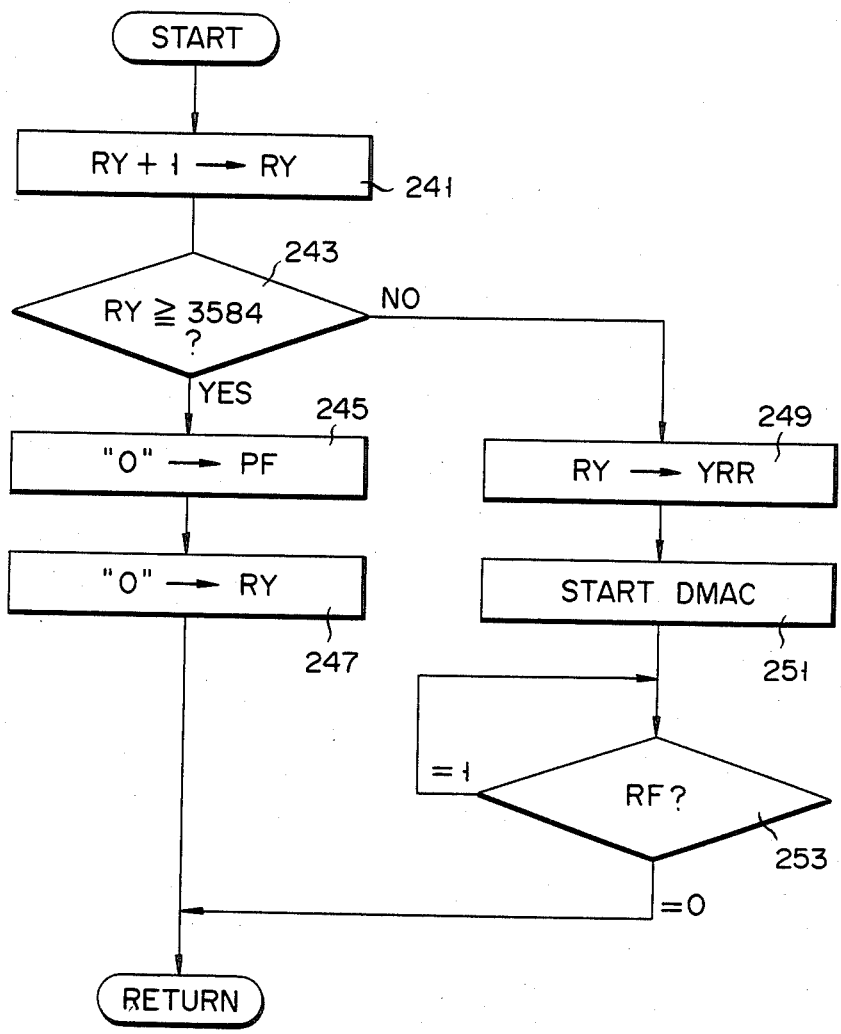
FIG. 36 is a flow chart explaining the CPU operation when data is transferred from the frame memory to an image printer.
Figure 37:
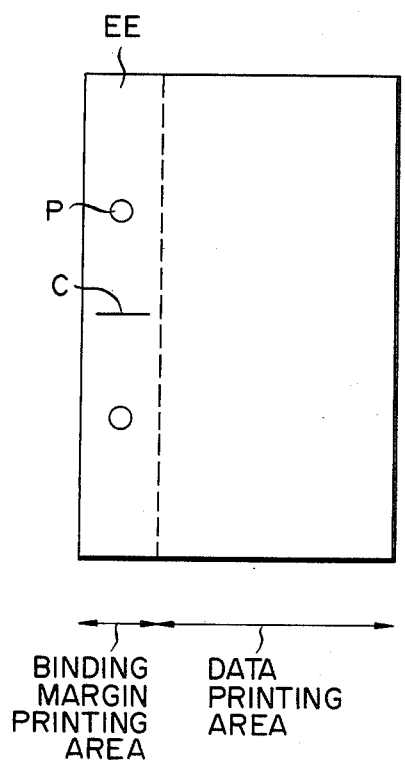
FIG. 37 is a representation showing a binding margin on a printing sheet in the system shown in FIGS. 1A to 1E.
Figure 38A:
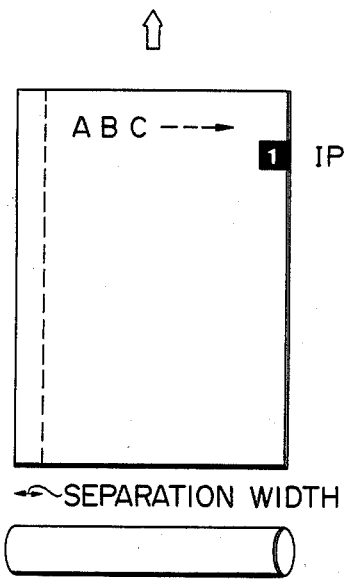
FIGS. 38A through 38D are representations showing printing states in accordance with formats (1) through (4), shown in FIG. 33.
Figure 38B:
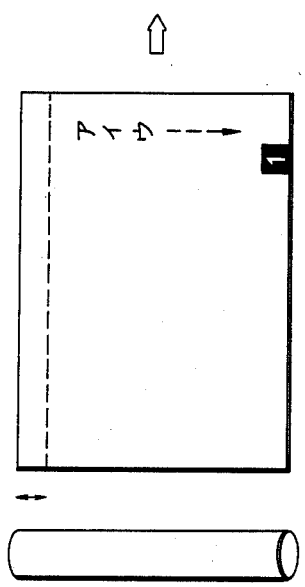
Figure 38C:
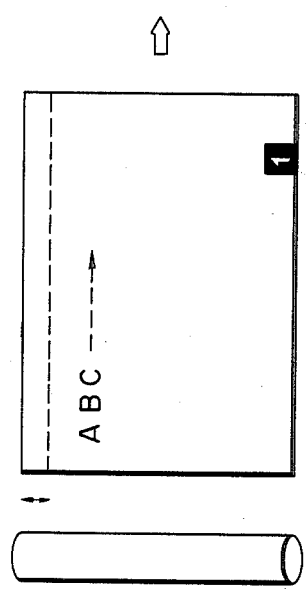
Figure 38D:
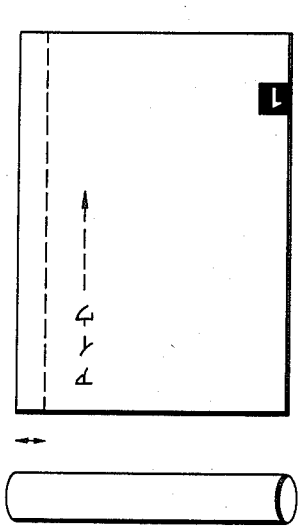

When the CPU 10 receives the printing end interrupt signal from the printer 18 upon the end of one-line printing, the content of the register RY, which represents a read position of the memory 16, is incremented by one in step 241, as shown in the flow chart of FIG. 36. The CPU 10 then checks, in step 243, whether or not the incremented value has reached a one-page line number (3584 dots: the Y dot number of the memory 16). If NO in step 243, the content of the register RY is set in the Y read address register YRR in the converter 20 in step 249. In step 251, the controller 19 is started. The CPU 10 checks the logic level of the flag RF in step 253 and waits until the flag RF is reset.

However, if YES in step 243, the flag RF is reset in step 245. The content of the register RY is also reset in step 247.

When the index is designated in the index mode determination, the write position falls within the format area of the index data IN·DATA. The index data is set in the data latch 21, and the pattern of the index data (IN·DATA) is written into the buffer 35. The index data is developed in the index area ID of the memory 16. For index data (IN·DATA) pattern processing, inversion designation data RV is set, and the pattern is forcibly inverted by an exclusive OR gate EX. The inverted data is stored in the memory 16. Slips indexed in this manner are stacked as shown in FIG. 39.

As described above, the index data whose black and white dots are inverted is selectively printed in an index designation position on the slip. Even if the printed slips are stacked, they can be easily sorted and identified. As a result, sorting of the documents can be greatly improved.

When the character patterns are rotated in accordance with the preset format, arranged on a page, and the printed sheets compiled, the printed characters will not be concealed since the page format is determined with reference to the binding margin (i.e., a separation width). (The relationship between the separation widths and the formats is shown in FIGS. 38A through 38D.)

In the above embodiment, the format designation data is supplied from the host system. However, the format designation data may be entered with keys or switches at a terminal. In the above embodiment, the separation width of the printer is used as a binding margin. In other words, the separation width is provided at the left side with respect to the paper feed direction. Printing cannot be performed for the separation width, so that the separation width is used as the binding margin. By assuring the binding margin, character rotation and arrangement are performed. However, the binding margin may be located at the right side with respect to the paper feed direction. In this case, character rotation and arrangement must be determined with respect to a right binding margin. The area for the binding margin need not be guaranteed in the memory 16. Furthermore, the binding margin need not be fixed at a predetermined position but can be varied within the memory 16 at an arbitrary width. The position and width of the binding margin are designated at the host or terminal side. Intrapage data writing is inhibited within the designated binding margin area. The data for printing the position, holes and a center mark of the binding margin may be prestored in a binding margin area of the frame memory 16.

What is claimed is:

1. A pattern data conversion processing system, comprising:
    first means for storing a plurality of one-character pattern data items, and for generating the one-character pattern data items according to input character codes;

second means for generating basic pattern data items obtained by dividing a one-character pattern data item generated by said first means;

third means for generating enlarged basic pattern data items in response to the basic pattern data items generated by said second means;

fourth means for storing a one-character pattern data item including the enlarged basic pattern data items generated by said third means and representing one enlarged character pattern data;

fifth means, coupled to said second, said third, and said fourth means, for controlling said second, third, and fourth means to perform the following operations:
  (i) one of the basic pattern data items generated by said second means is converted to one of the enlarged basic pattern data items by said third means;
  (ii) the enlarged basic pattern data item is written into said fourth means; and
  (iii) said operations of (i) and (ii) are repeated until the enlarged basic pattern data items amount to one enlarged character pattern data item, and are written into said fourth means;

sixth means for storing one-page pattern data including the enlarged one-character pattern data items read from said fourth means;

seventh means connected to said fourth and said sixth means, for controlling said fourth and sixth means to perform the following operations:
  (iv) each enlarged one-character pattern data item is read from said fourth means immediately after being written into said fourth means, and is then written into said sixth means; and
  (v) said operation (iv) is repeated until enlarged one-character pattern data amounting to one page are written into said sixth means;

eighth means for printing one-page pattern data when read out from said sixth means; and ninth means, coupled to said sixth and said eighth means, for controlling said sixth and eighth means so that the one-page pattern data is read out from said sixth means immediately after being written into said sixth means, to be printed.

2. A system according to claim 1, wherein said third means comprises:
  tenth means for storing 4/3 times enlarged pattern data items, and for generating the same, in response to the basic pattern data items generated by said second means;
  a bypass circuit for bypassing said tenth means; and
  means for selectively activating said tenth means and said bypass circuit.

3. A system according to claim 2, comprising means connected to said tenth means and to said bypass circuit, for storing double enlarged pattern data items, and for selectively generating the double enlarged pattern data items in response to the 4/3 times enlarged pattern data items and the bypassed basic pattern data items.

4. A system according to claim 3, wherein said double enlarged pattern data storing means comprises means for storing 90° rotation-converted basic pattern data items and non-rotation-converted basic pattern data items, and for selectively generating the 90° rotation-converted pattern data items and the non-rotation-converted pattern data items in response to the 4/3 times enlarged pattern data items and the bypassed basic pattern data items.

5. A system according to claim 4, wherein said seventh means comprises means for rotating, by 180°, the 90° rotation-converted pattern data items and the non-rotation-converted pattern data items, and for generating corresponding 270° rotation-converted pattern data items and 180° rotation-converted pattern data items.

6. A system according to claim 1, wherein said sixth means has a binding storage area and an index storage area at a side opposite that of the binding storage area, for forming a document with corresponding binding and index areas, and said ninth means is inhibited from generating addresses corresponding to the binding storage area and the index storage area of said sixth means so that document data is prohibited from being stored in the binding storage area and the index storage area.

* * * * *